US012808699B2

(12) United States Patent
Han et al.

(10) Patent No.: US 12,808,699 B2
(45) Date of Patent: Nov. 24, 2026

(54) WEAKLY-SUPERVISED LEARNING FOR MANHOLE LOCALIZATION BASED ON AMBIENT NOISE

(71) Applicant: NEC Laboratories America, Inc., Princeton, NJ (US)

(72) Inventors: Shaobo Han, Princeton, NJ (US); Yuheng Chen, South Brunswick, NJ (US); Ming-Fang Huang, Princeton, NJ (US); Ting Wang, West Windsor, NJ (US); Alexander Bukharin, Atlanta, GA (US)

(73) Assignee: NEC Corporation, Tokyo (JP)

( * ) Notice: Subject to any disclaimer, the term of this patent is extended or adjusted under 35 U.S.C. 154(b) by 598 days.

(21) Appl. No.: 18/367,593

(22) Filed: Sep. 13, 2023

(65) Prior Publication Data

US 2024/0102833 A1 Mar. 28, 2024

Related U.S. Application Data

(60) Provisional application No. 63/407,141, filed on Sep. 15, 2022.

(51) Int. Cl.
*G01D 5/353* (2006.01)

(52) U.S. Cl.
CPC ................................ *G01D 5/35361* (2013.01)

(58) Field of Classification Search
CPC .... G01D 5/35361; G01H 9/004; G06N 3/045; G06N 3/0464; G06N 3/0895
See application file for complete search history.

(56) References Cited

U.S. PATENT DOCUMENTS

| | | | | |
|---|---|---|---|---|
| 2020/0313763 | A1* | 10/2020 | Wang | H04B 10/25753 |
| 2020/0401784 | A1* | 12/2020 | Salemi | G06N 3/0464 |
| 2022/0129791 | A1* | 4/2022 | Nia | G06N 7/01 |
| 2025/0277693 | A1* | 9/2025 | Noetzli | H04W 4/38 |

* cited by examiner

*Primary Examiner* — Peet Dhillon
(74) *Attorney, Agent, or Firm* — Vincent Duffy

(57) ABSTRACT

A DFOS system and machine learning method that automatically localizes manholes, which forms a key step in a fiber optic cable mapping process. Our system and method utilize weakly supervised learning techniques to predict manhole locations based on ambient data captured along the fiber optic cable route. To improve any non-informative ambient data, we employ data selection and label assignment strategies and verify their effectiveness extensively in a variety of settings, including data efficiency and generalizability to different fiber optic cable routes. We describe post-processing steps that bridge the gap between classification and localization and combining results from multiple predictions.

7 Claims, 28 Drawing Sheets

| Name | Type | # Parameters | Output Shape |
|---|---|---|---|
| layer1.0 | Conv2d(1, 6, kernel_size=(3, 3), stride=(1, 1)) | 54, 6 | 32,6,28,28 |
| layer1.1 | ReLU() | | 32,6,28,28 |
| layer1.2 | MaxPool2d(kernel_size=2, stride=2, padding=0, dilation=1, ceil_mode=False) | | 32,6,14,14 |
| layer2.0 | Conv2d(6, 8, kernel_size=(3, 3), stride=(1, 1)) | 432, 8 | 32,8,12,12 |
| layer2.1 | ReLU() | | 32,8,12,12 |
| layer2.2 | MaxPool2d(kernel_size=2, stride=2, padding=0, dilation=1, ceil_mode=False) | | 32,8,6,6 |
| layer3.0 | Conv2d(8, 10, kernel_size=(3, 3), stride=(1, 1)) | 720, 10 | 32,10,4,4 |
| layer3.1 | ReLU() | | 32,10,4,4 |
| layer3.2 | MaxPool2d(kernel_size=2, stride=2, padding=0, dilation=1, ceil_mode=False) | | 32,10,2,2 |
| fc1 | Linear(in_features=40, out_features=24, bias=True) | 960, 24 | 32,24 |
| sq_ab | ReLU() | | 32,24 |
| fc2 | Linear(in_features=24, out_features=2, bias=True) | 48, 2 | 32,2 |
| prob | Softmax(dim=1) | | 32,2 |

FIG. 8

| Number of patches | Dev AUC (patch-level) | Dev AUC (location-level) | Test AUC (patch-level) | Test AUC (location-level) |
|---|---|---|---|---|
| 100 | 0.9225 | 1 | 0.8862 | 0.9549 |
| 500 | 0.9495 | 1 | 0.9112 | 0.9931 |

*FIG. 10*

Non-Manhole Location

Manhole Location

WEAKLY-SUPERVISED LEARNING FOR MANHOLE LOCALIZATION BASED ON AMBIENT NOISE

CROSS-REFERENCE TO RELATED APPLICATIONS

This application claims the benefit of U.S. Provisional Patent Application Ser. No. 63/407,141 filed Sep. 15, 2022, the entire contents of which is incorporated by reference as if set forth at length herein.

FIELD OF THE INVENTION

This application relates generally to fiber optic communications. More particularly, it pertains to distributed fiber optic sensing (DFOS) systems, methods, and structures in conjunction with weakly-supervised learning for manhole localization based on ambient noise.

BACKGROUND OF THE INVENTION

Optical fiber sensing technology has become increasingly ubiquitous in many applications using dedicated or existing fibers, such as pipeline surveillance, railway crack or intrusion detection, seismic monitoring, tunnel steel loop structure monitoring, traffic and road condition monitoring, and cable safety protection.

As the backbone of the 5G and other networks, a large portions of fiber optic cables are buried under roads with slack optical fibers preserved in manholes. To fix faults in the fiber, a mapping between fiber length and geographic location is needed.

Optical time-domain reflectometry (OTDR) is a common method used by field technicians to locate fiber faults. However, OTDR often fails since complicated fiber cable deployment paths and fiber slacks reserved along the route can make the OTDR distance much longer than the geographic distance from the central office (CO) to the fault location with a typical mismatch of 15-20%.

Distributed fiber optic sensing (DFOS) has recently been proposed as a non-destructive solution to conduct underground cable mapping. With DFOS, manholes can be used as landmarks for underground cable mapping, preventing error propagation due to complicated cable deployment paths. Once the landmark positions (with known GPS coordinates) are pinpointed on the cable, the GPS coordinates of cable segments in-between these landmarks can be derived through linear interpolation. For this technique to work effectively, one must localize the manholes along the cable route. Beyond use as landmarks, localizing manholes is important for carriers and operators to enhance the efficiency of network operations as well. Currently, manhole localization through fiber sensing technology requires external vibrations such as hammer strikes on manhole lids. This procedure is labor-intensive, time-consuming, and impractical for large-scale deployment. Consequently, an improved method for manhole localization along a fiber optic route would represent a welcome addition to the art.

In this work, we propose a new approach for manhole localization based on ambient traffic signals over deployed cables sensed by the DFOS. The proposed method is based on deep learning with selective sampling and a learning-based attention module for supervision enhancement.

SUMMARY OF THE INVENTION

The above problem is solved and an advance in the art is made according to aspects of the present disclosure directed to a manhole localization along deployed fiber optic cables. In sharp contrast to the prior art, our inventive method determines the manhole localization from ambient noise on the fiber optic cables in conjunction with deep learning with selective sampling and a learning-based attention process for supervision enhancement. The learning-based attention process provides interpretable information on the selection of meaningful data across time periods with different traffic densities. As a result, our inventive method does not require hand-labeling across time for machine learning training.

Operationally, our inventive method employs weakly supervised learning for manhole localization based on ambient noise, and includes collecting, using a distributed fiber optic sensing (DFOS) system, sensing signals that include ambient noise over a period of time and generating, from the collected sensing signals, sensing test data; identifying, in the sensing test data, DFOS locations indicative of manhole and non-manhole locations; preprocessing, using the identified sensing test data indicative of manhole and non-manhole locations, sensing training data such that it contains strong vibrations at both manhole and non-manhole locations; training, using the preprocessed sensing training data, a neural network; applying the sensing test data to the trained neural network and obtaining, classification results on manhole and non-manhole locations; and outputting an indicia of the classification results including manhole and non-manhole locations.

BRIEF DESCRIPTION OF THE DRAWING

A more complete understanding of the present disclosure may be realized by reference to the accompanying drawing in which:

FIG. 8 is a model architecture for ambient traffic-based manhole localization according to aspects of the present disclosure;

FIG. 10 shows model performance comparison on number of top patches, and location-wise vs. patch-wise decision according to aspects of the present disclosure;

FIG. 22(A) and FIG. 22(B) are a pair of plots of Prediction Score vs Distance for: FIG. 22(A) same road predictions on a roadway 1; and FIG. 22(B) different road predictions on a roadway 3, according to aspects of the present disclosure;

FIG. 24(A) and FIG. 24(B) are a pair of waterfall plots and corresponding gradient plots at: FIG. 24(A) non-manhole location, and FIG. 24(B) manhole location in which lighter regions in the gradient plots represent higher gradient scores according to aspects of the present disclosure.

DETAILED DESCRIPTION OF THE INVENTION

Figure 1A:
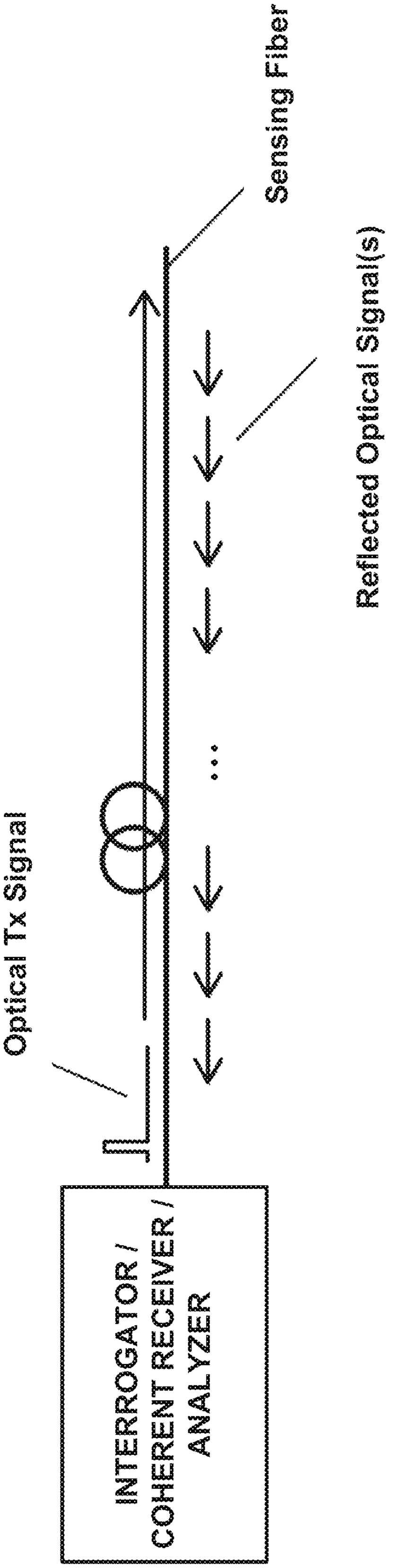
FIG. 1(A) is a schematic diagram showing an illustrative DFOS system according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

Figure 1B:
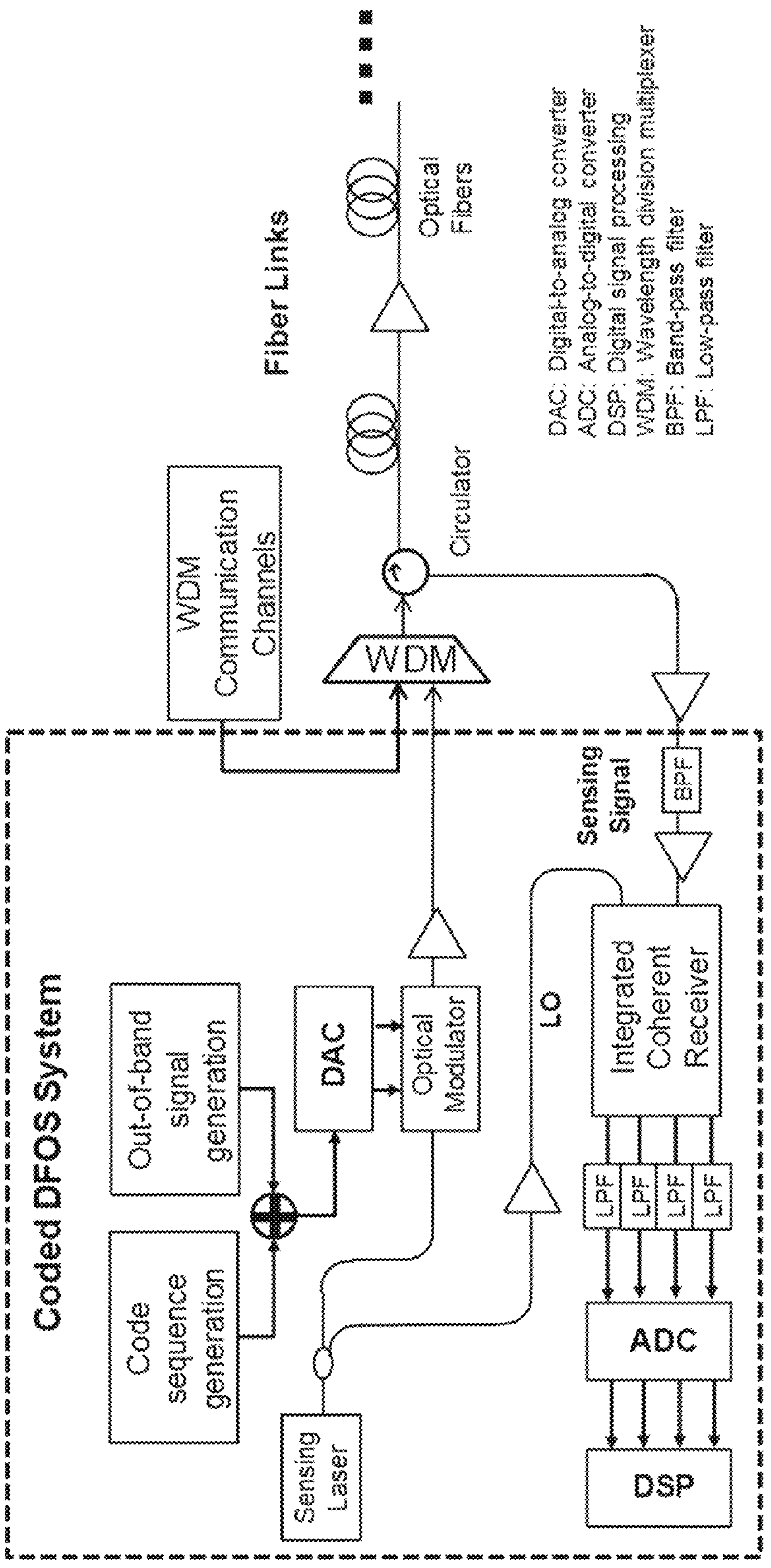
FIG. 1(B) is a schematic diagram showing an illustrative architecture for coherent-detection Rayleigh OTDR according to aspects of the present disclosure.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art and shown illustratively in FIG. 1(B).

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe, we use distributed fiber optic sensing (DFOS) technology based on ambient traffic data along the fiber optic cable route for: 1) Manhole localization; 2) Slack fiber detection; and 3) Road surface defect detection (e.g., holes, cracks, etc.).

Advantageously, our inventive systems and methods employ novel, newly-designed ML algorithms that: 1) Provide an automated solution based on ambient traffic patterns; 2) Identify manhole locations from the sensing data; 3) A supervised learning algorithm—to distinguish the coil section inside the manhole; and 4) Estimate the length of the slack fiber.

A further advantage, the method can also be applied to identify and localize road surface defects. Whenever the vehicle run across the damage road surface like pothole etc., unique signal patterns are generated and detected by DFOS system. By applying our inventive method, the location of the event, thus the location of the defect can be identified. As will be understood and appreciated, such capability facilitates unattended reporting and rapid repair of a roadway thereby improving both safety and driving experience.

Figure 2:
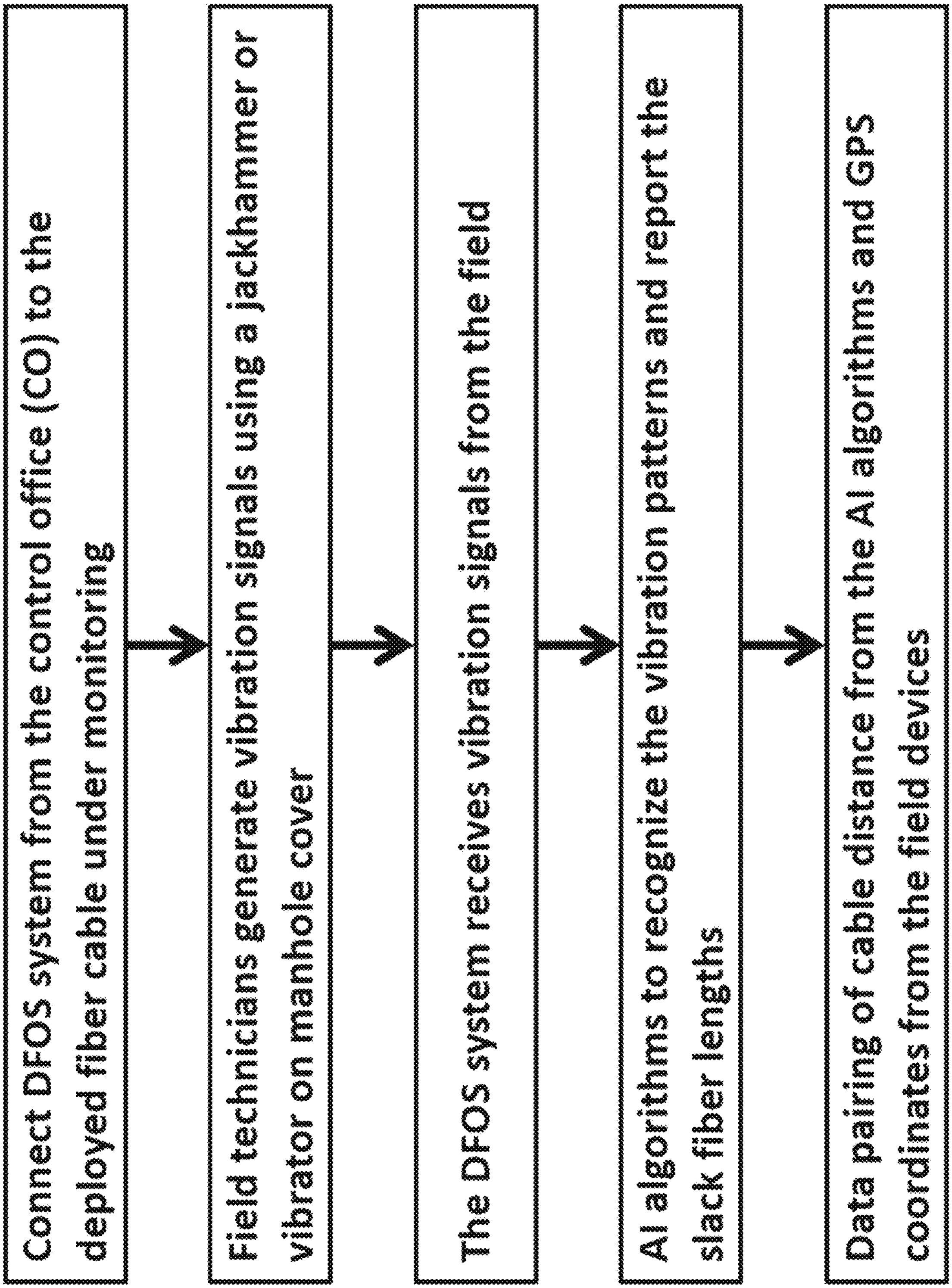
FIG. 2 is a schematic diagram showing an illustrative workflow of existing manual inspection of manhole location and slack fiber lengths.

FIG. 2 is a schematic diagram showing an illustrative workflow of existing manual inspection of manhole location and slack fiber lengths. As will be apparent to those skilled in the art, there are numerous drawbacks to present methods.

First, an inaccurate baseline map results from a lack of up-to-date information. Consequently, the baseline manhole locations to which comparisons may be made are not accurate.

Second, Blind zone of the field inspection result from geographical constraints as some manholes may not be accessible including those on a roadway or within a forest.

Finally, the existing manual methods are inefficient as manual checks are laborious and time consuming.

Figure 3:
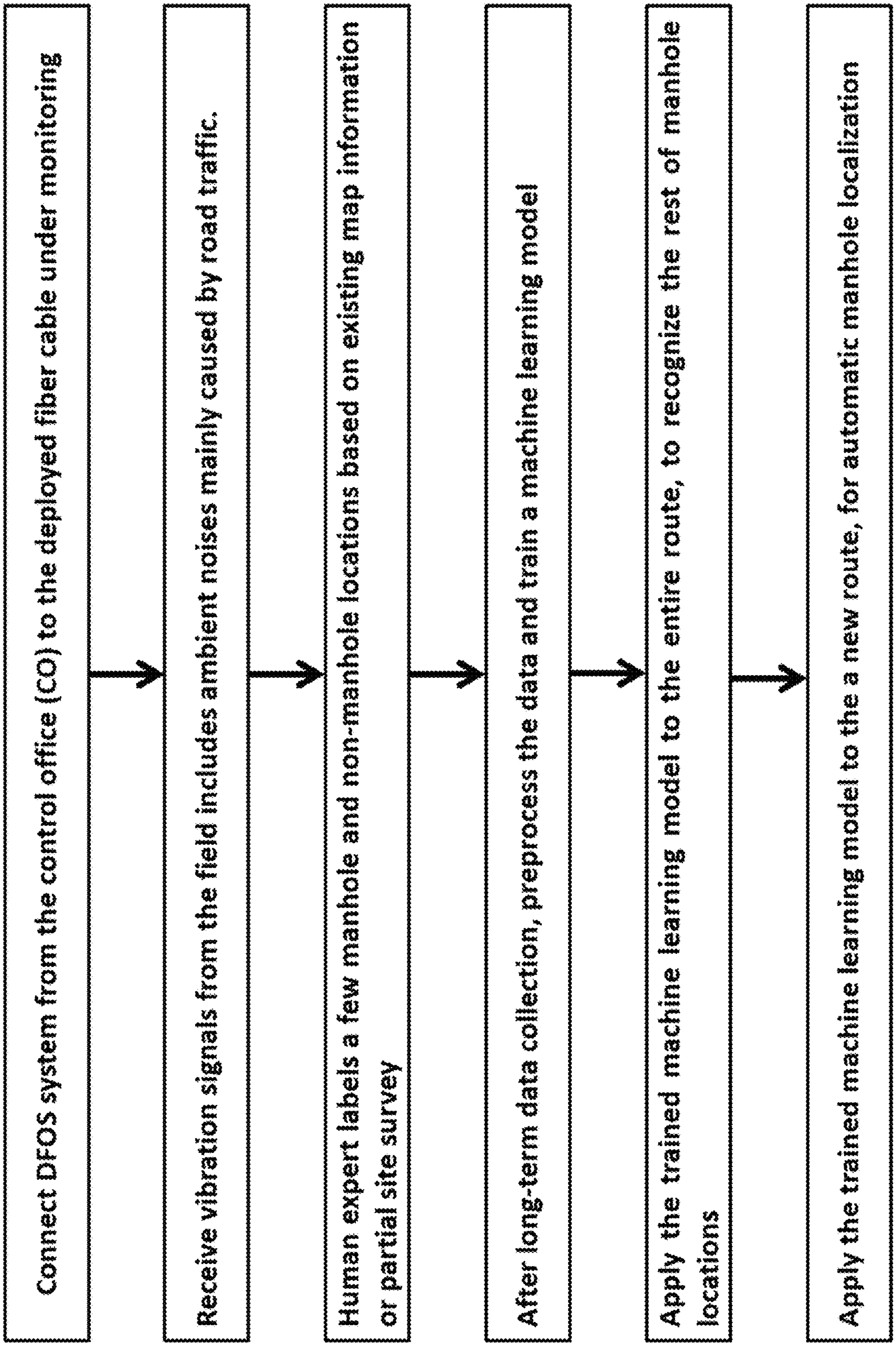
FIG. 3 is a schematic diagram showing an illustrative workflow of an automated manhole localization and slack fiber length detection according to an aspect of the present disclosure.

FIG. 3 is a schematic diagram showing an illustrative workflow of an automated manhole localization and slack fiber length detection according to an aspect of the present disclosure.

Figure 4:
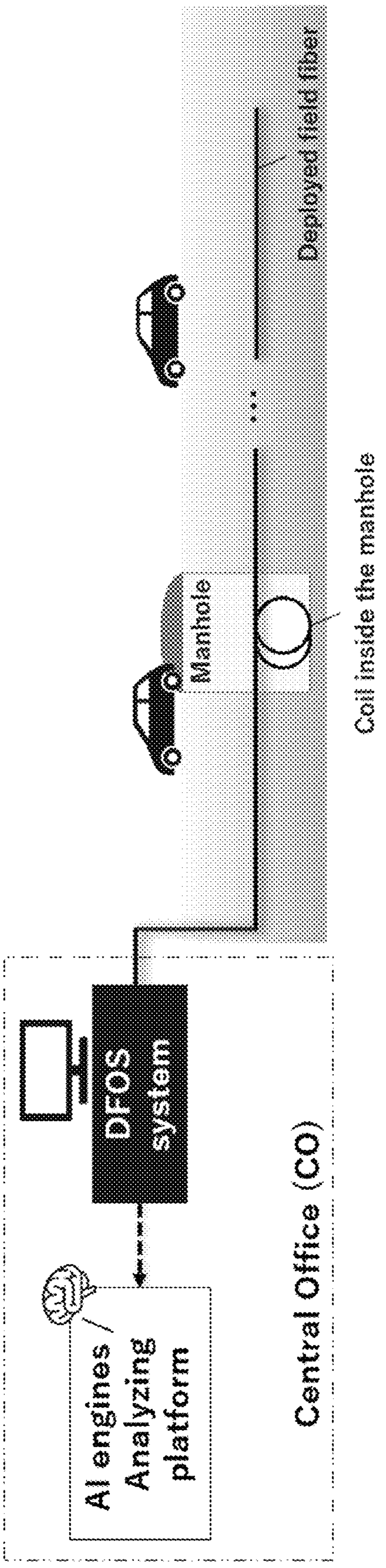
FIG. 4 is a schematic diagram showing an illustrative system arrangement for automated manhole localization and slack fiber length detection according to an aspect of the present disclosure.

FIG. 4 is a schematic diagram showing an illustrative system arrangement for automated manhole localization and slack fiber length detection according to an aspect of the present disclosure.

As may be observed from the system arrangement illustratively shown in FIG. 4, the DFOS that provides distributed acoustic sensing (DAS) and/or distributed vibration sensing (DVS) is located in a central office (CO) for remote monitoring of entire fiber optic cable route. From this centralized location, DFOS data is collected from the ambient traffic signals for further analysis.

Figure 5:
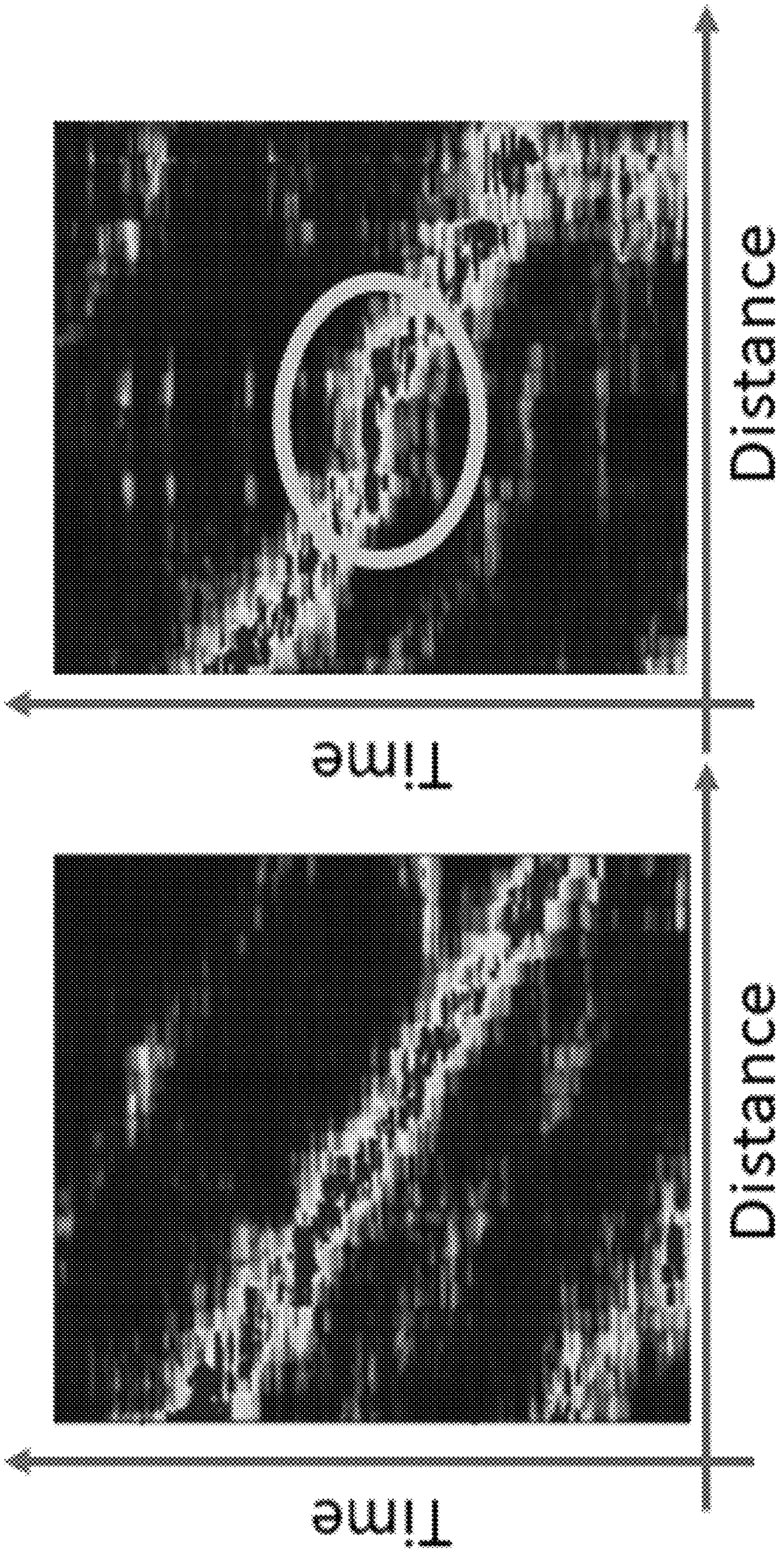
FIG. 5 shows a pair of Time vs Distance DFOS waterfall plots of illustrative traffic trajectories along a fiber optic cable by passing (left plot) non-manhole; and (right plot) manhole with slack fiber sections according to aspects of the present disclosure.

Typical, illustrative traffic signals received from the DFOS system operation are shown in FIG. 5(A) and FIG. 5(B) which show a pair of Time vs Distance DFOS waterfall plots of illustrative traffic trajectories along a fiber optic cable by passing (FIG. 5(A)) non-manhole; and (FIG. 5(B)) manhole with slack fiber sections according to aspects of the present disclosure. For a vehicle running at near constant speed within time of observation, a straight trace with a constant slope is expected. However, whenever a vehicle passed by a manhole, the slack fiber inside the manhole will be vibrated simultaneously, and thus generate a horizontal bar signal (marked in circle) at that location as shown in FIG. 5(B). This pattern is the signature for the proposed scheme.

Step 1: Connect the DFOS system to a buried underground fiber optic cable and start collecting sensing signal (e.g., waterfall traces) that contains ambient traffic caused vibrations for a period.

Step 2: In order to train machine learning models, we provide a labels for manhole and non-manhole locations. Such labels can be from an existing map (even incomplete), or a partial site survey, or manual recognition from domain experts. One can look at the waterfall and pick up a few locations with high confidence.

Step 3: Preprocess the sensing training data, such that it contains strong vibrations at both manhole and non-manhole locations. Consequently, in model training, the deep neural network is forced to learn the difference between the two.

Selecting Informative Data

The underlying concept learned is largely dependent on the training data. Random sampling leads to suboptimal performance. Manhole locations usually generate large vibrations when a vehicle is passing that results from longer fiber spans or a "bump" from a manhole-cover.

Comparably, a random sample from non-manhole locations may only have weak vibrations. A machine learning model trained in this way can only classify strong vibrations vs. weak vibrations, rather than the intended goal of manhole vs. non-manhole.

Notwithstanding, it is still a weakly supervised learning paradigm in the sense that the label (manhole or non-manhole) is confirmed only at the location level, not the patch level. In random sampling, it is likely that some patches do not contain any useful information for the classification at all.

To solve this problem, a supervision enhancement procedure is employed in our inventive method. It means that if we label one location as manhole or non-manhole, then every instance from that location shall contain discriminative features to support the decision. Toward this goal, informative data is selected for better model training.

Those skilled in the art will understand and appreciate that it is difficult to set a universal, hard threshold for data selection, as the sensitivity fluctuates across different time periods and locations. According to aspects of the present disclosure, we describe a location-specific, data selection procedure detailed as follows:

After selecting the informative samples based on the procedure described above, the supervision becomes stronger.

Figure 6:
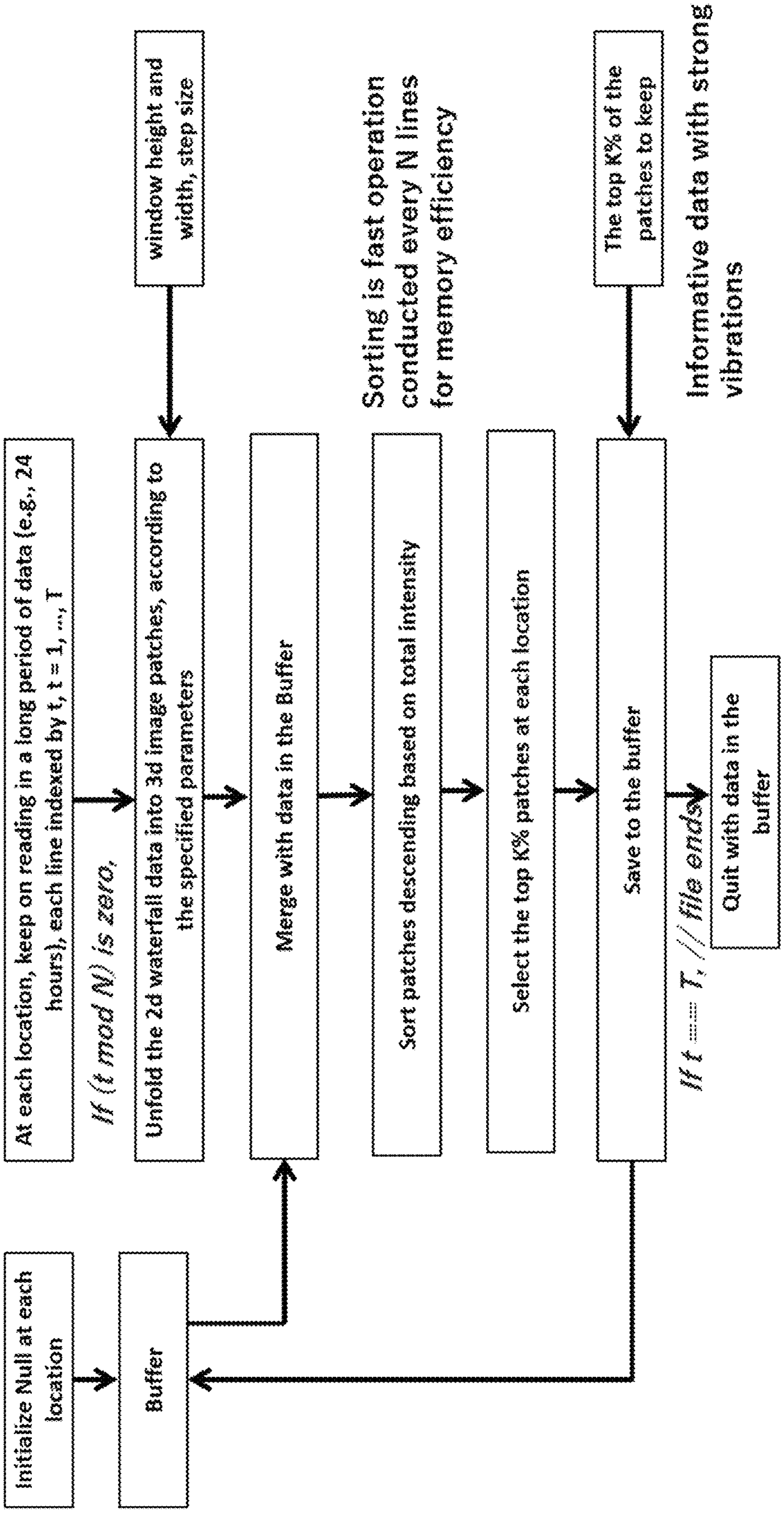
FIG. 6 is a schematic flow diagram showing illustrative data selection scheme with hard-mining and memory optimization according to aspects of the present disclosure.

FIG. 6 is a schematic flow diagram showing illustrative data selection scheme with hard-mining and memory optimization according to aspects of the present disclosure.

The scheme illustratively shown in FIG. 6 selects relatively strong vibrations caused by ambient traffic at each manhole and non-manhole location, and the model is forced to learn the difference between those patterns. One may also use it in combination with other criterion, such as signal-to-noise ratio (SNR), or standard deviation. In addition to the patterns illustrated in FIG. 5(A) and FIG. 5(B), there are also other discriminative patterns. We provide a few examples in FIG. 7.

Figure 7:
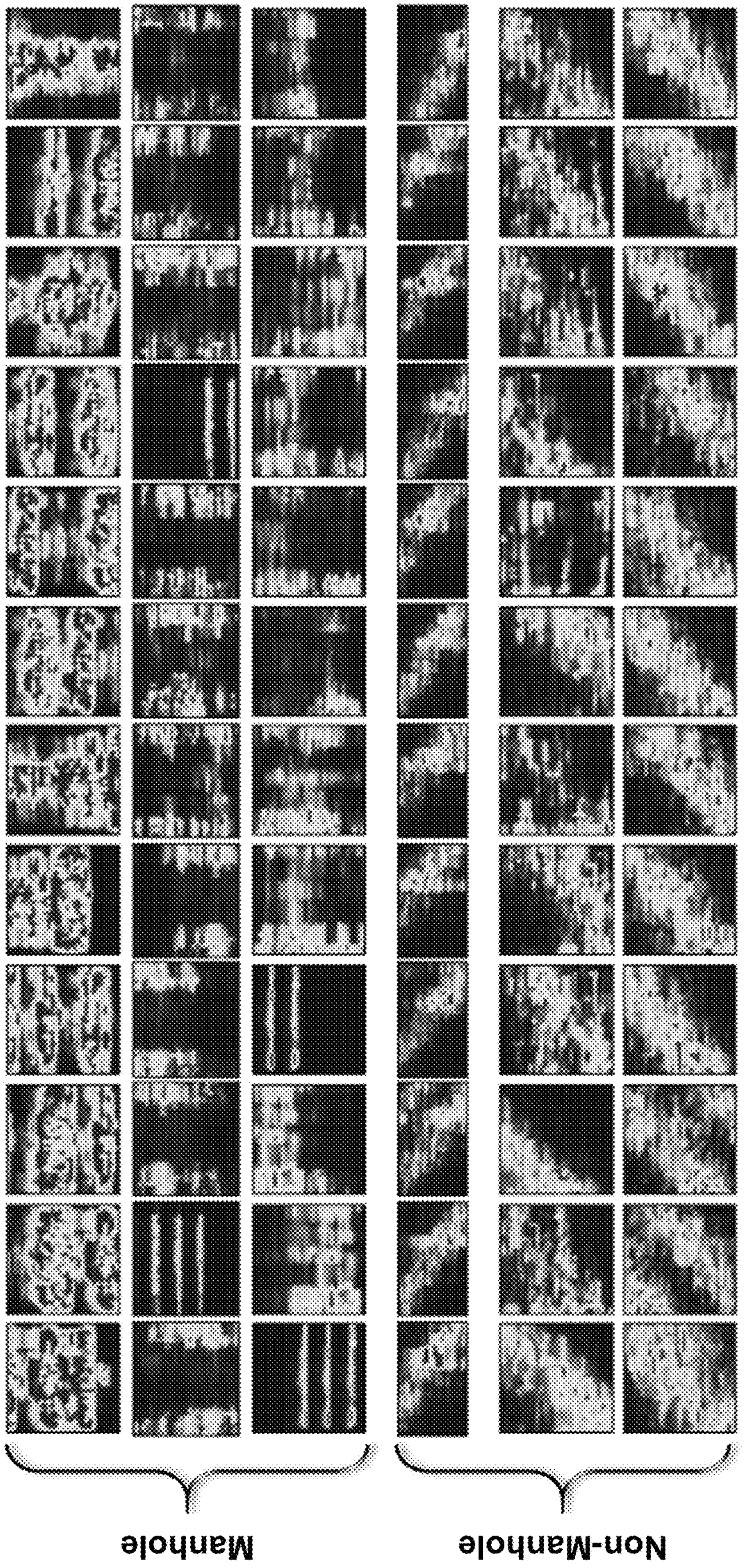
FIG. 7 is a series of exemplary waterfall image patches at manhole locations (rows 1, 2, and 3) and non-manhole locations (rows 4, 5, and 6), according to aspects of the present disclosure.

FIG. 7 is a series of exemplary waterfall image patches at manhole locations (rows 1, 2, and 3) and non-manhole locations (rows 4, 5, and 6), according to aspects of the present disclosure. Advantageously, the multiple channel architecture of deep neural networks can capture these multiplicity patterns.

Accommodating Different Coil Lengths

Another consideration is how to deal with different widths of vibration patterns. Due to different lengths of fiber optic cable coils inside each manhole, the widths of vibration patterns may range from few meters to tens of meters. Setting a window width to the largest possible will ultimately impair the spatial resolution of manhole localization, while setting it too small will only capture partial patterns. Accordingly, we employ a median number of 48 meters. If a manhole width is wider than that, performing dense spatial subsampling (it can be viewed as one kind of data augmentation) is employed.

We have found this scheme works well empirically. During training procedure, patches centered at multiple neighboring locations are sampled, and a classification model assigns each patch a label of the location to which it belongs. Since the strength of supervision has been enhanced by sorting, the patch labels and location labels have high correspondence. During inference procedure, the location label is determined by majority voting at the patch level. The disagreement between patch labels manifests the level of uncertainty.

Note that considering the duration of vibration caused by vehicle passing manhole cover, we set the height of the window to be 30, which is about 3.60 seconds.

Handling Large Noises

Occasionally, there may be pixels possessing extremely large values. This could be caused by some optical noise and in practice, this impairs model convergence. To address this issue, the value of the sensing data is clipped to a maximum value in preprocessing. Different from natural images, the patches need NOT to be standardized to zero mean and unit variance.

Step 4: Train the neural network. The neural network architecture is shown in FIG. 8 which illustratively shows a model architecture for ambient traffic-based manhole localization according to aspects of the present disclosure. To prevent overfitting, it is also helpful to divide training, validation, and test sets across different locations and different days. The weight between two classes shall be balanced.

Step 5: Feed the sensing test data of the whole route into exactly the same procedure with the training data. To ensure the trained model generalizes to new locations and new routes, the data needs to be preprocessed in exactly the same way.

Figure 9:
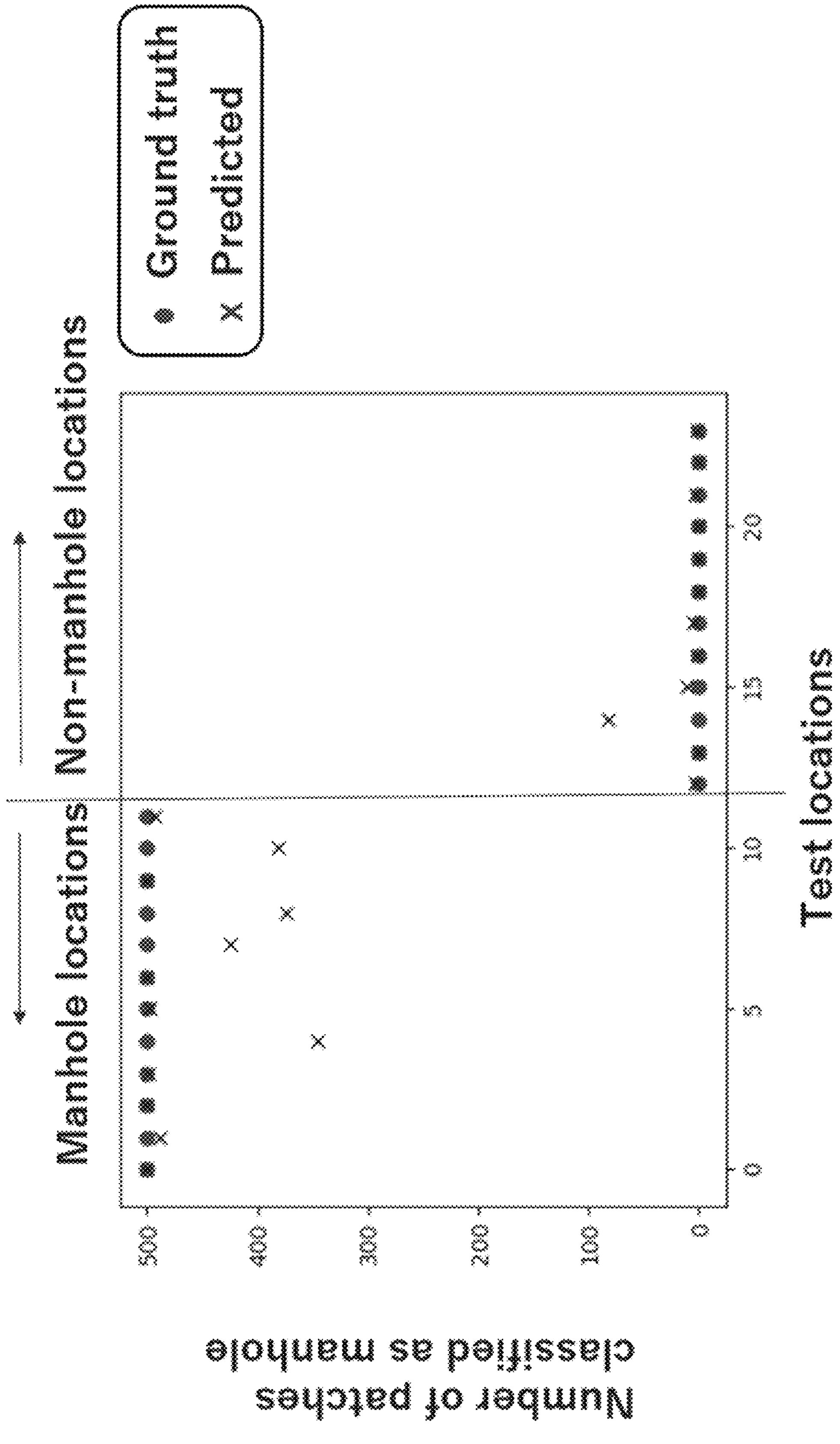
FIG. 9 is a schematic diagram showing illustrative patch level prediction based on 500 samples per test location according to aspects of the present disclosure.

FIG. 9 is a schematic diagram showing illustrative patch level prediction based on 500 samples per test location according to aspects of the present disclosure. FIG. 9 shows test results on 24 locations (12 manhole, 12 non-manhole). The two classes can be perfectly separated at the location level.

FIG. 10 shows model performance comparison on number of top patches, and location-wise vs. patch-wise decision according to aspects of the present disclosure. FIG. 10 further shows more details. In the supervision enhancement procedure (sorting patches), we experimented with different choices of top number of patches (e.g., 100, 500). It can be seen that in both cases, the location-level decision is more accurate than the patch-level decision.

Step 6: Apply the neural network inference to the whole fiber optic cable route and obtain classification results on manhole or non-manhole locations. The location step size may influence the test accuracy, smaller step size is recommended.

Figure 11:
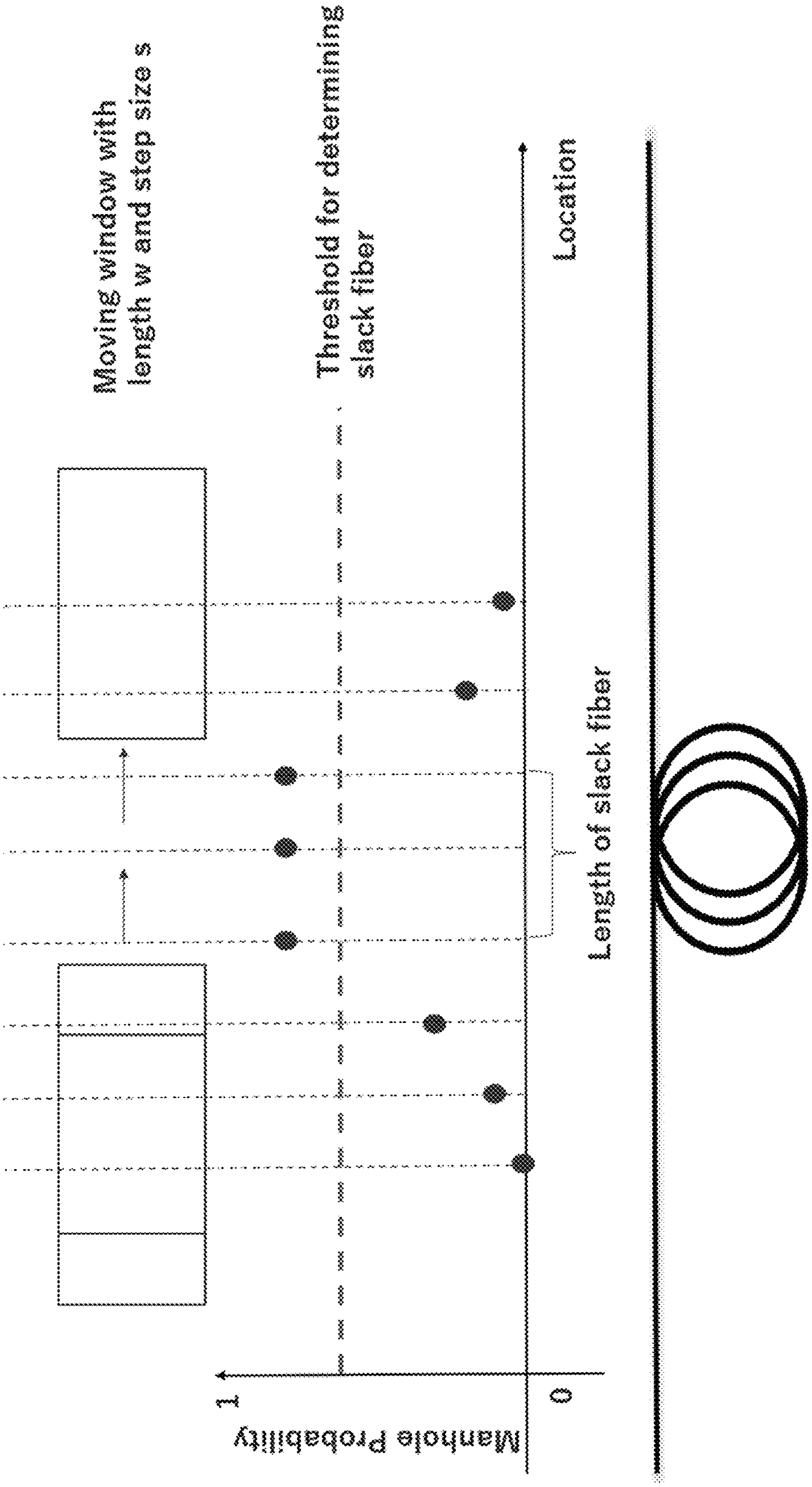
FIG. 11 is a schematic diagram showing illustrative determination of a length of slack fiber by sliding window according to aspects of the present disclosure.

In addition, it also benefits the estimate of the slack fiber length. To determine the length of slack fiber, we apply a sliding window spatially, moving with small step size, and setting a threshold on the model outputs. FIG. 11 shows an illustration of the scheme and is a schematic diagram showing illustrative determination of a length of slack fiber by sliding window according to aspects of the present disclosure.

In the conventional approach, the length of slack fiber is estimated based on the width of vibration pattern in a single experiment. In contrast, this our inventive scheme can inherently summarize supervisory information from many manholes (even different routes), therefore it is more accurate.

Figure 12:
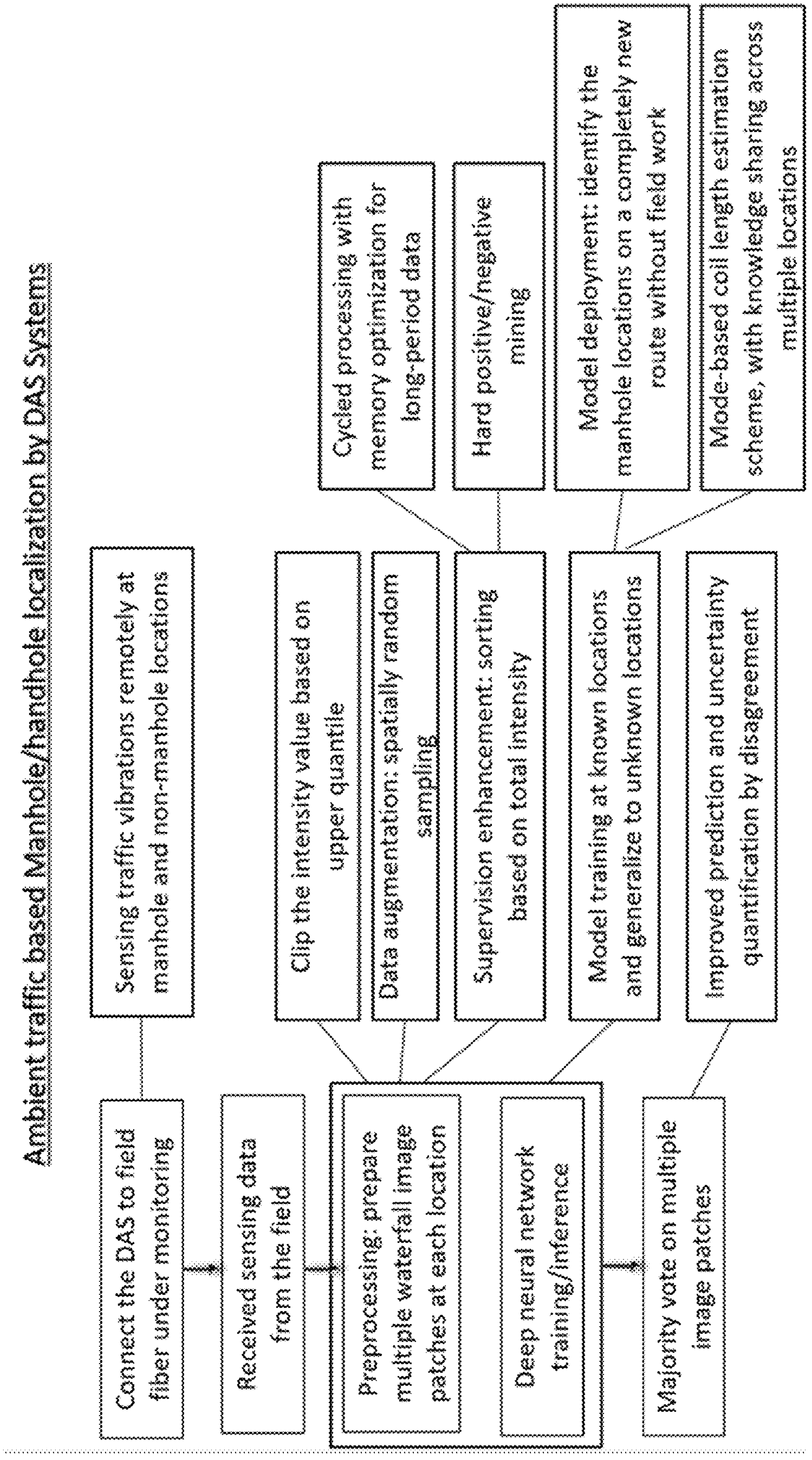
FIG. 12 is a schematic diagram showing illustrative ambient traffic based manhole/handhole localization by Distributed Fiber Optic Sensing/Distributed Acoustic Sensing according to aspects of the present disclosure.

FIG. 12 is a schematic diagram showing illustrative ambient traffic based manhole/handhole localization by Distributed Fiber Optic Sensing/Distributed Acoustic Sensing according to aspects of the present disclosure.

We now disclose an operational test evaluation/further theoretical basis for our inventive systems and methods.

Figure 13:
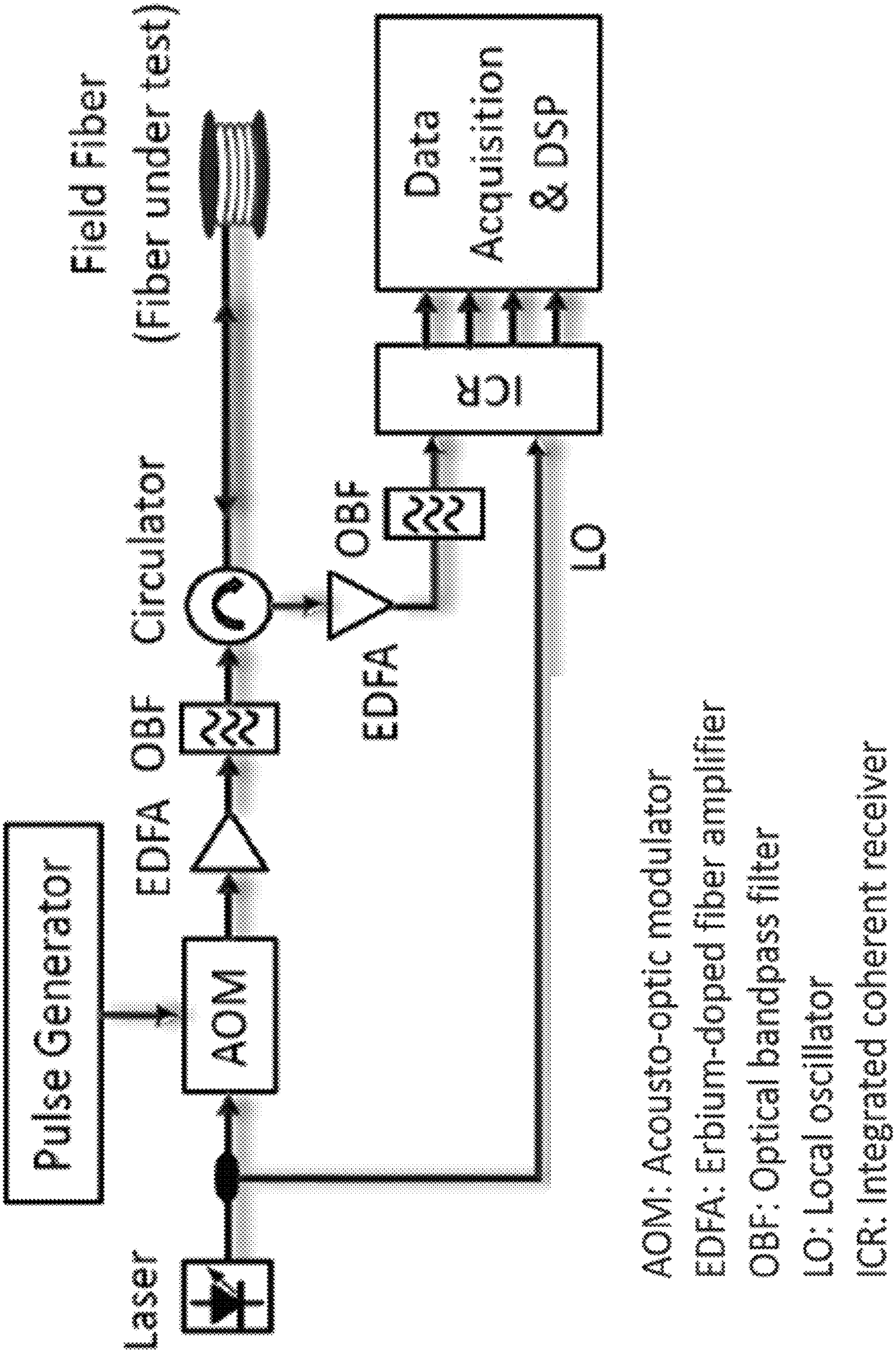
FIG. 13 is a schematic diagram showing an illustrative architectural arrangement for coherent-detection Rayleigh Optical Time-Domain Reflectometry (OTDR) according to aspects of the present disclosure.

FIG. 13 is a schematic diagram showing an illustrative architecture for coherent-detection Rayleigh OTDR according to aspects of the present disclosure. With reference to that figure and as will be readily appreciated by those skilled in the art, DFOS system is a coherent-detection Rayleigh phase OTDR. Using coherent detection, the DFOS system recovers the full polarization and phase information of the Rayleigh backscatter from the field fiber (Fiber under test, FUT).

In a typical coherent-receiver-based DFOS system such as that shown in FIG. 13, the sensing laser is also used as the local oscillator (LO) to down-convert the backscatter signal to the electric baseband. Inside the receiver (Data Acquisition & DSP), the Rayleigh backscatter field h(t) can then be reconstructed from the outputs of the optical hybrid and balanced photodiodes, which corresponds to the in-phase (I) and quadrature (Q) components of the two polarizations:

$$y(t)=e^{j\phi_{Tx}(t)}[x(t)\otimes h(t)]+n(t), \quad [1]$$

where y(t) is the coherent receiver output and x(t) is the modulated interrogation signal, which in this case is an optical pulse with configurable width for adjusting the spatial resolution and reach of the DAS system, and n (t) is the noise term which consisted of mostly optical amplifier noise and quantization noise of the ADC. The optical pulse repetition (frame) rate of $R_p=1/T_p$ is also adjusted to be longer than the round trip propagation delay of the FUT, and $\varphi_{Tx}(t)$ is the phase noise of the sensing laser. The four baseband electrical signals are sampled by analog-to-digital converters at the sampling rate of $R_s=1/T_s$ before digital signal processing (DSP) is implemented in the field-programmable gate array (FPGA).

After initial digital filtering, the two digitized complex signals (at two polarizations) are parallelized into frames to obtain $y[n;m]\triangleq y(nT_s+mT_p)$, which is a 2×1 complex-valued vector of the backscatter electric field at each distance index n and time index m. With the parallelized data arrangement, differential phase beating of Rayleigh scatters at different locations can be computed between pairs of polarizations i and j in DSP:

$$\xi_{ij}[n, m] = y_i[n, m]y_j^*[n-\Delta_g, m],\ i, j \in \{1, 2\}, \quad [2]$$

where Δg is the delay value that emulates a differential gauge length of $z_g=\Delta_g(c/(2n_{eff}))T_s$, which is adjustable in the DSP to provide tuning of spatial resolution and sensitivity, with $c/(2n_{eff})$ being the effective speed of light in fiber.

To mitigate Rayleigh fading due to polarization, the DFOS system applies a rotated vector sums method to combine four separate beating pairs, where the DC phase of the vectors is rotated and aligned after low pass filtering. Compared to obtaining one beating pair with only one polarization, which could produce large errors if either of the terms $y_i[n,m]$ or $y_i[n-\Delta_g, m]$ goes into a fade, using both polarizations produces four separate beating pairs which can greatly reduce the chance of polarization fading after they are combined. The unwrapped phase of the summed differential product $\theta[n,m]=\angle\xi[n,m]$ is an estimate of the strain $\epsilon[n,m]$ at time $mT_p$ and fiber location $d_n=(n-\Delta_g?2)\cdot(c?(2n_{eff}))\cdot T_s$. As $\delta\theta \propto \delta\epsilon$, the output of the DFOS allows reconstruction of the vibration via tracking of time-varying changes in $\delta\theta$.

With further reference to FIG. 13, we note that the system employs a native ADC sampling rate of 250 Msps, corresponding to a spatial resolution limit of 0.4 m. Due to FPGA resource limitation, the output DFOS phase results were furthered down-sampled 4 times to the spatial resolution of 1.6 m. The optical pulse was created using an acousto-optic modulator (AOM) with 40-ns width. The AOM will create a frequency shift $f_{AOM}$ in x(t) so the modulated interrogation signal becomes $x(t)=e^{j2\pi f_{AOM}t}\cdot x_{base}(t)$, where $x_{base}(t)$ is the original optical pulse without frequency shift. When performing differential phase beating using equation (2), the AOM frequency shift will introduce a constant coefficient of $e^{j2\pi f_{AOM}(\Delta_g T_s)}$ in $\zeta_{ij}[n,m]$, which is a DC phase term (same for all locations and time frames). As DAS measures dynamic strain changes instead of static strain, the phase introduced by the extra coefficient will be effectively removed by digital bandpass filtering in the DSP. The frame rate of DFOS was set at 2000 Hz to monitor multiple routes with the whole length from 15 km to ~25 km. To obtain the waterfall plot for image analysis by the machine learning algorithm, the vibration intensity was calculated by first band-passing each location channel with cutoff frequencies at 30 Hz and 200 Hz. The frequency range was selected during initial calibration testing such that high vibration SNR for vehicular traffics can be achieved. The filtered signal was then squared and accumulated over samples to obtain an update rate of ~10 Hz for each location.

Figure 14:
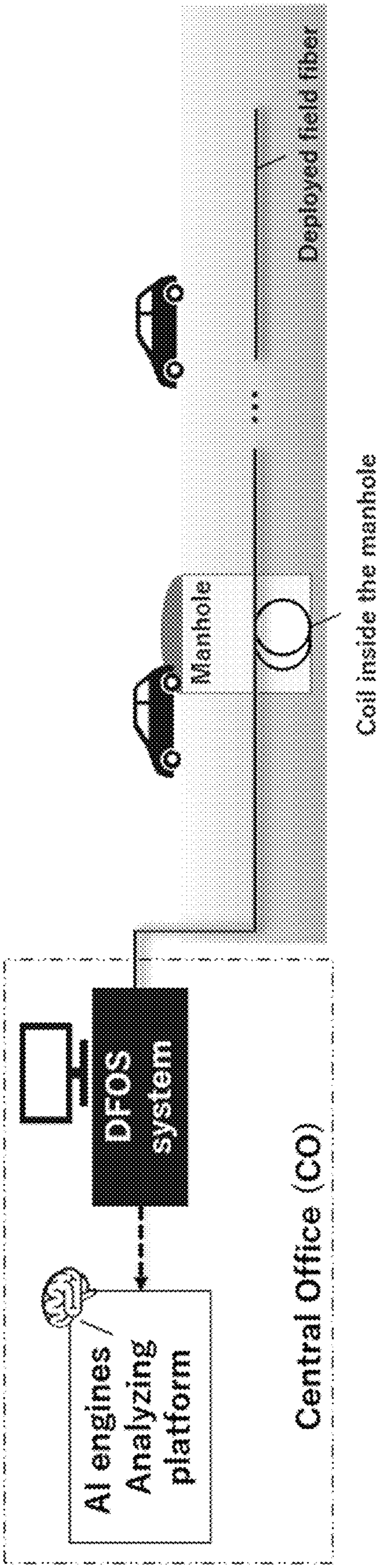
FIG. 14 shows the experimental evaluation setup for manhole localization through ambient traffic according to aspects of the present disclosure.

FIG. 14. is a schematic diagram showing our illustrative experimental arrangement for manhole localization using ambient traffic according to aspects of the present disclosure. As shown in FIG. 14, the sensing system is connected to a deployed single mode fiber (SMF) for ambient data collection. The sensing system measures a vibration strength along the length of the fiber optic cable every 120 milliseconds and creates a vibration array. We refer to this array as a "waterfall". When plotted, the horizontal axis represents the location along the fiber and the vertical axis time. Within the time-location plane, we use the color map to represent the intensity of the local vibration. This vibration array can thus be viewed as an image, where the x-axis and y-axis correspond to the sensing distance and detection period.

Figure 15:
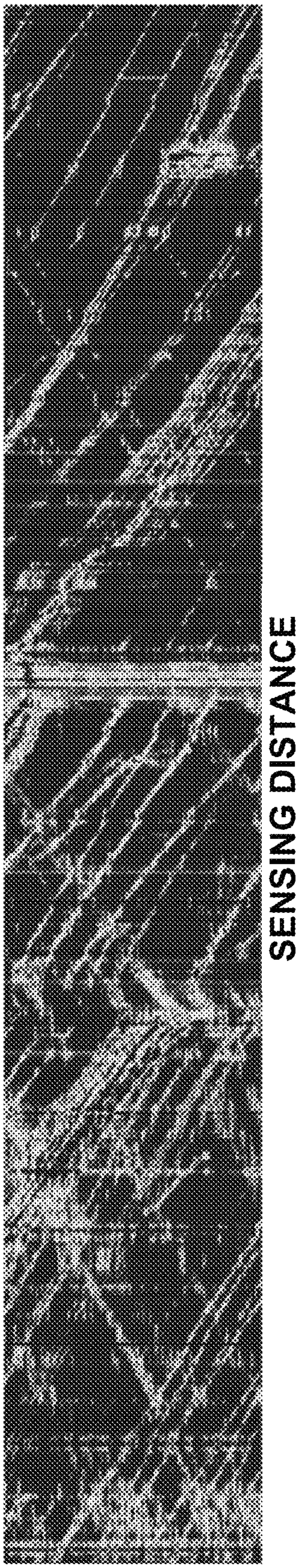
FIG. 15 shows an exemplary waterfall plot in which diagonal lines identify vehicles traveling along a roadway according to aspects of the present disclosure.

FIG. 15 shows an exemplary waterfall plot in which diagonal lines identify vehicles traveling along a roadway according to aspects of the present disclosure. As shown in this 40-second duration waterfall plot, a pixel color is used to represent the intensity of signals caused by vibrations near the cable. Warmer colors on the waterfall represent higher intensity vibrations. In this way, we can view the historical vibrational map along the optic fiber route. Any static vibration next to the route will cause a vertical stripe on the waterfall plot (e.g., the middle part in FIG. 15). In contrast, an object moving along the route, for example, a vehicle, causes diagonal traces, such as that illustratively depicted in FIG. 16, which shows a series of exemplary waterfall patterns at: (A) non-manhole, (B) manhole locations via traffic trajectory, (C) traffic excited stripes at manhole locations, (D) traffic excited stripes at non-manhole locations, and (e)— (h) hard cases for which manholes cannot be classified as manhole and non-manhole, according to aspects of the present disclosure.

Figure 16:
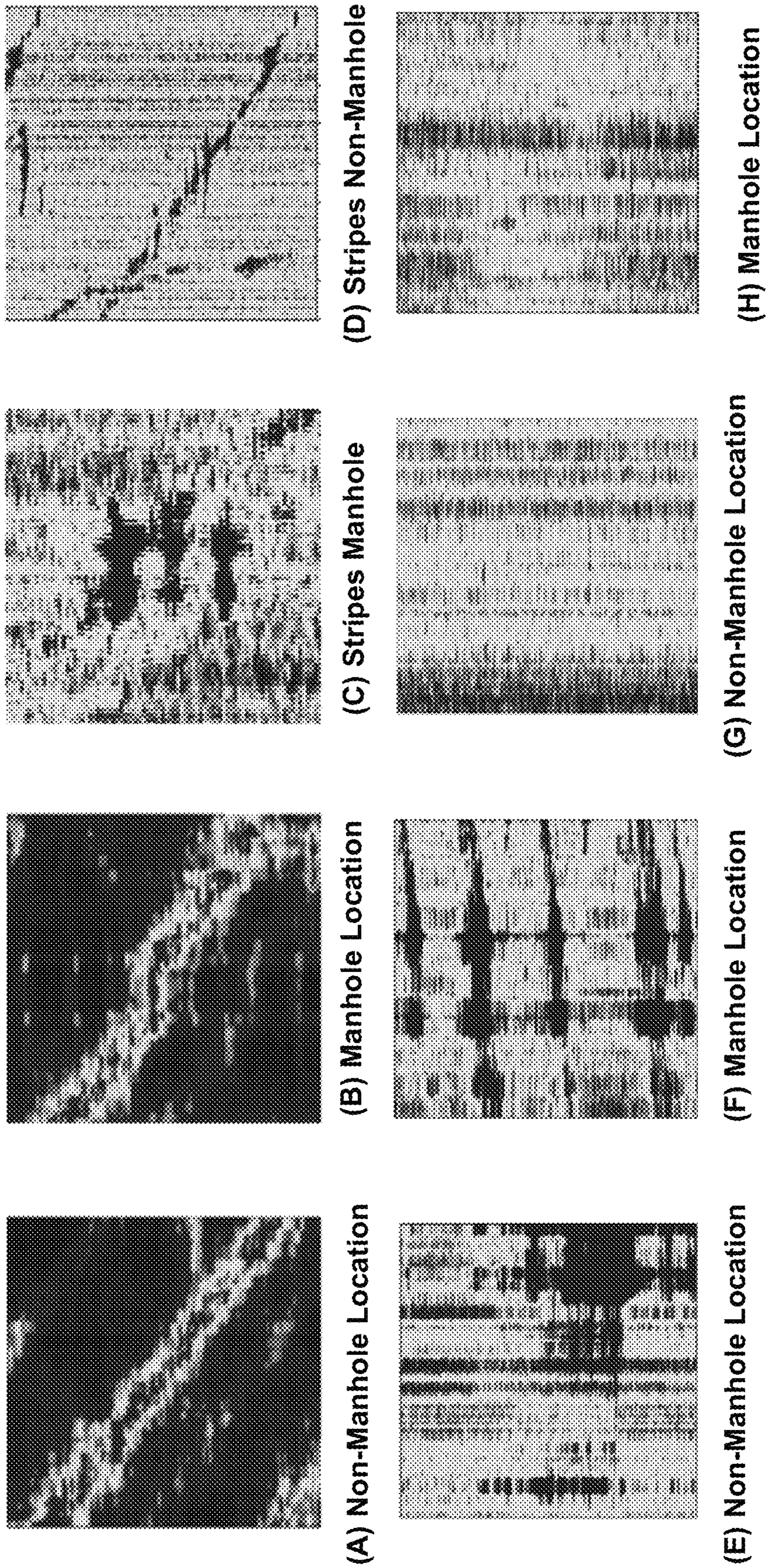
FIG. 16 shows a series of exemplary waterfall patterns at: (A) non-manhole, (B) manhole locations via traffic trajectory, (C) traffic excited stripes at manhole locations, (D) traffic excited stripes at non-manhole locations, (e)-(h) further hard cases in classifying manhole and non-manhole, according to aspects of the present disclosure.

As illustratively shown in FIG. 16, (A) is a non-manhole location. Any slack cable coil stored in the manhole/handhole on the route will be excited simultaneously whenever a vehicle passes by. It, therefore, results in a horizontal stripe with a width equal to the length of the coil, creating two disconnected diagonal trajectories as illustratively shown in FIG. 16, (B), a manhole location.

If a vehicle runs across a manhole lid, it creates a much larger impact on the local area compared to normal driving. It will excite the fiber section much further away from the point of the interaction, also creating a horizontal strip superpose on the diagonal trace. The extension of the stripe, however, is approximately symmetric with the center on the diagonal trajectory. And the stripe is in fact tilting slightly upward due to the finite propagation speed of the impact surface wave on the ground such as that illustratively shown in FIG. 16, (C), for examples from multiple vehicles). These phenomena allow humans and machines to identify manholes and slack fibers from ambient sensing data.

Discriminative features useful for manhole localization are mainly created by vehicles interacting with roads and manholes. Due to different factors including vehicle types, driving speeds, fiber coil lengths, and sensing distances, the resulting vibration signatures are nonidentical. Therefore, it is hard to handcraft rules to detect these features. Instead, we propose a supervised learning approach, in which once a model is trained with labels at a sufficient amount of manholes, the rest of the manholes (along the same or different routes) can be automatically detected.

Picking discriminative frames that can be used to train the model, from hours of sensing data and thousands of candidate locations is both a challenging and tedious task for humans. For one reason, the discriminative pattern does not always appear (see FIGS. 16, (G) and (H)). Moreover, vehicles passing road cracks or potholes may generate similar-looking patterns such as that illustratively shown in FIG. 16, (D). To confidently determine which locations are manholes and which are not would largely depend on the experience of a technician making the determination. As such, we now present our weakly-supervised machine learning-based approach, which can automatically select discriminative patterns from ambient traffic data and localize manholes.

To identify manhole locations, the sensing data is viewed as an image, and spatial-temporal features relevant to manholes are extracted with a convolutional neural network (ConvNet) mode. One challenge when training a ConvNet for manhole localization is the weak informativeness of ambient data. Most portions of the ambient data contain little information due to the low density of traffic. Manually annotating the time periods during which discriminative vibration events occur is very tedious and time-consuming. To deal with this problem, we employ two data selection strategies: a heuristic top-K strategy and a learned data selection strategy.

We find that the top-K operator is more effective when the number of inference samples is large. On the other hand, the learned selection strategy is less accurate when the number of inference samples is large but can yield better performance when little inference data is available. In practice, one can choose between the two data selection strategies based on how much inference data is available. We emphasize that the performance depends not only on the model architecture but also crucially on how the datasets are composed.

Data Preparation

Label Assignment

We divide the waterfall plot into small image patches of size H×w. At each location along the fiber optic cable, a classification label of "manhole" or "non-manhole" is assigned. Optionally, one can also include a third class indicating an aerial cable location. A classification model is trained to predict which segments of the cable lie in a manhole.

In conventional fully supervised image classification, the objective is to directly classify each image. In our manhole localization problem, the objective is to classify at the location level, which contains multiple images collected at the same location. It is desirable to have labels for every image patch, but only coarse-grained labels at the location level are available.

Figure 17:
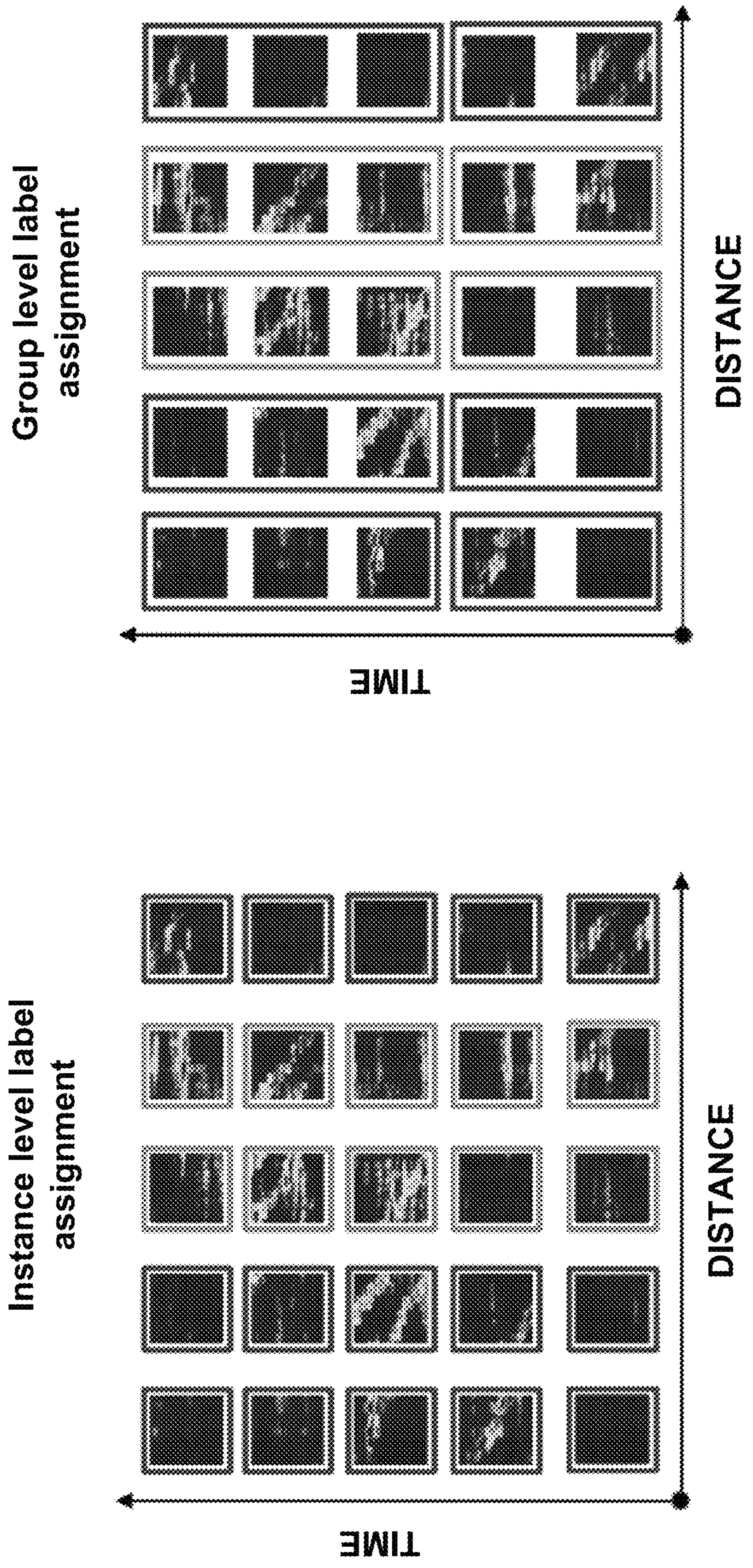
FIG. 17 shows a pair of different illustrative labeling assignment strategies for our model in which the boxes indicate which set of patches the location label is assigned to, showing manhole and non-manhole according to aspects of the present disclosure.

The generalization performance of the model depends crucially on the label assignment strategy, that is, how the location label is assigned to patches collected at the same location. We consider training the classifier either at the instance-level or at the group-level, the corresponding label assignment strategies are illustrated in FIG. 17, which shows a pair of different illustrative labeling assignment strategies for our model in which the boxes indicate which set of patches the location label is assigned to, showing manhole and non-manhole according to aspects of the present disclosure.

In the instance-level approach, the location label is assigned directly to each image patch from that location. The model predicts labels for each image patch. In the group-level approach, the location label is assigned at the group level in an indirect way to a group of image patches without telling which patches are discriminative. The model learns to assign importance to each image patch.

As those skilled in the art will understand and appreciate, our inventive approach belongs to the weakly-supervised learning paradigm, which does not require expensive temporal annotation. To be more specific, the weak supervision is inexact. Group-level labeling allows the model to provide greater flexibility and modeling power, which is particularly useful in low-data scenarios in the test time. However, the greater flexibility also makes the group-level data harder to train on, as the model may overfit the data or ignore some patches during training.

Data Selection

Besides annotation, the performance of supervised learning is heavily influenced by the way the training dataset is composed. A key problem with using all collected image patches is that many images may contain no relevant information about manhole presence. If the road is not busy, the cable will only pick up weak background vibrations and informative patterns will be very sparse on the waterfall. With these non-informative examples, it is very difficult to differentiate images from manhole or non-manhole locations. Moreover, brutely assigning a label of "manhole" or "non-manhole" to these non-informative images may confuse the model and hinder performance. To enhance the quality of our dataset, we propose two strategies to select the most informative examples at each location for our model to be trained and evaluated on.

One simple strategy employs a heuristic data selection strategy based on the total intensity of patches, referred to as the top-K sampling scheme. We observe that the most informative images contain higher levels of vibration, usually corresponding to a car passing over the fiber optic cable segment. To extract these images, we select the top-K images with the highest total vibration level at each location. Later in this disclosure, we compare this scheme against a baseline random sampling scheme. This strategy works quite well when the number of images to select from is large but deteriorates when the number of samples is small. This is due to the fact that when the number of available samples at a location is small, the top-K samples may contain little useful information.

Training: Network Architecture

ConvNets have achieved great successes in a variety of computer vision tasks ranging from image classification to object detection and have been shown to be useful for threat classification and event detection based on phase-OTDR data. In one example, the denoising CNN (DnCNN) model is used to enhance the signal-noise ratio of Raman OTDR traces viewed as 2D images. In this disclosure, we use a relatively shallow ConvNet with four convolutional layers followed by two fully connected layers for classification.

As illustratively implemented, our convolutional layer works as follows. For every input-output channel pair, $$z_{:,:,s} = \sum_{r=1}^{C_{in}} g_{:,:,r} * f_{r,s,:,:}, \qquad [3]$$

where $g \in \mathbb{R}^{H \times W \times C_{in}}$ denotes $C_{in}$ channels of input of size H×W, $z \in \mathbb{R}^{H' \times W' \times C_{out}}$ denotes $C^{out}$ channels of output of size H×w, and $f \in \mathbb{R}^{C_{in} \times C_{out} \times k \times k}$ denotes the convolutional filter. Each output channel feature map is obtained by sliding the k×k kernel $f_{r,s,:,:}$ over the input channel feature map $g_{:,:,r}$ by the 2D convolution operator *. For the first layer, the input is the waterfall patches $x \in R_{H \times W}$ with $C_{in}=1$. In addition, the $\ell$-th fully connected layers work as follows, $$z^{\ell+1} = \phi^{\ell T} z^{\ell} + b^{\ell}, \qquad [4]$$

where $\{\Phi_{\ell}, b_{\ell}\}$ are the parameters. We use ReLU as the nonlinear activation function for the model layers except for the last one uses softmax. A detailed description of the model design and the size of input and outputs can be seen in Table 1.

TABLE 1

Convolutional neural network architecture details.

| Layer | Layer Type | Feature Maps | Size | Kernel Size | Stride | Activation |
|---|---|---|---|---|---|---|
| Input | Image | 1 | 50 × 50 | — | — | — |
| 1 | Convolution | 10 | 52 × 52 | 3 × 3 | 1 | ReLU |
| 2 | Max Pooling | 10 | 26 × 26 | 2 × 2 | 2 | ReLU |
| 3 | Convolution | 10 | 28 × 28 | 3 × 3 | 1 | ReLU |
| 4 | Max Pooling | 10 | 14 × 14 | 2 × 2 | 2 | ReLU |
| 5 | Convolution | 5 | 16 × 16 | 3 × 3 | 1 | ReLU |
| 6 | Max Pooling | 5 | 8 × 8 | 2 × 2 | 2 | ReLU |
| 7 | Convolution | 5 | 10 × 10 | 3 × 3 | 1 | ReLU |
| 8 | Max Pooling | 5 | 5 × 5 | 2 × 2 | 2 | ReLU |
| 9 | Fully Connected | — | 45 | — | — | ReLU |
| 10 | Fully Connected | — | 2 | — | — | Softmax |

To train the model, we minimize the cross-entropy loss of our training set with the Adam optimization algorithm. Several regularization and normalization techniques are adopted, including dropout, batch normalization, and weight decay. We find these regularization techniques to be necessary as some routes contain high levels of label noise. In some cases, the labeled "non-manhole" location contains some manholes that are not identified.

Deep Multiple Instance Learning

As an alternative to the top-K strategy, we may instead learn which images are important with an attention-based multiple instance learning (MIL) framework. Using an attention-based MIL framework gives several benefits. First, it allows the model to make predictions on a group level by deciding which images are most important for each location. This allows more complex patterns to be learned at each location. Second, the learned attention scores provide a level of model interpretability, allowing cable operators to see which images were important for the model's decision.

The MIL model works as follows. For every image $x_k \in R^D$ at a location, we extract a vector embedding $h_k \in R^M$ with the ConvNet, and then calculate an attention score for each image as $$a_k = \frac{\exp\{w^T \tanh(Vh^T{}_k)\}}{\sum_{k=1}^{K} \exp\{w^T \tanh(Vh_k^T)\}}, \quad [5]$$

where $w \in R^{L\times 1}$ and $v \in R_{L\times M}$ are learned parameters. We can then combine the vector embeddings according to their attention scores to get a final vector representation for each location. This attention mechanism can be thought of as a learned data selection mechanism embedded into the model.

Figure 18:
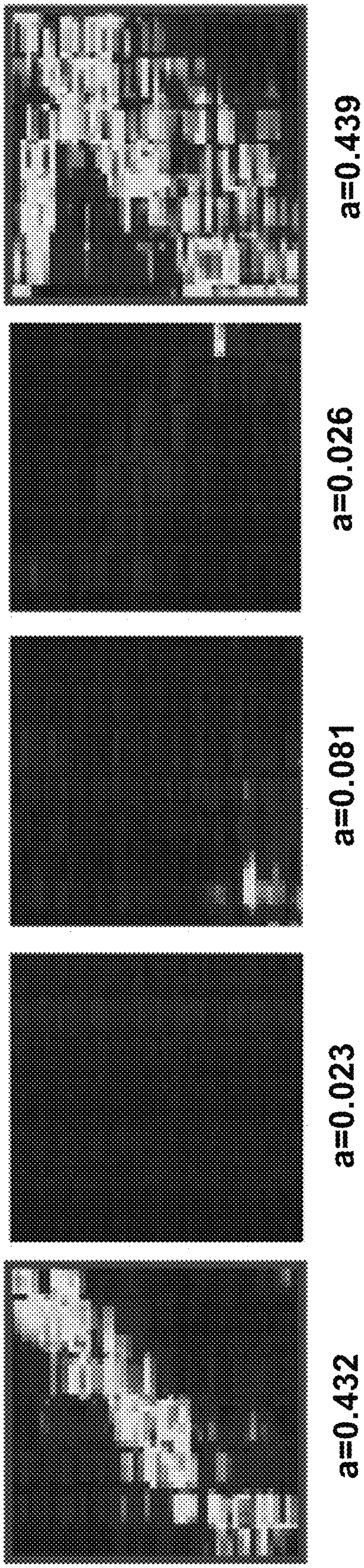
FIG. 18 shows a series of attention scores from the MIL model with images having the highest attention scores outlined according to aspects of the present disclosure.

We can visualize the MIL attention scores assigned to different images at a location. An example can be seen in FIG. 18, which shows a series of attention scores from the MIL model with images having the highest attention scores outlined according to aspects of the present disclosure. The MIL mechanism clearly picks out the most informative images by assigning them a high attention score, demonstrating the usefulness of the learned attention mechanism.

The attention score can be used to quantitatively assess the weak informativeness contained in each patch. Looking across longer periods of time, one may identify temporal trends such as correlations to rush hours and select the best time period to collect data.

Inference: From Classification to Localization

Once a classification model is trained on the group or patch level, we can output manhole predictions at the location level via a post-processing procedure, which further boosts the performance, especially when generalizing to a new roadway with distribution shifts. The post-processing procedure includes three steps.

Averaging: at every location along the cable, we sample multiple patches (baseline ConvNet) or construct multiple groups of image patches (MIL). Each set of data is fed into the classification model, and the probability of that location can be obtained by averaging the binary classification decisions across different patches or groups.

Adaptive threshold: each location is initially assigned a binary label based on an adaptive threshold that can be tuned for each roadway. The threshold can be dynamically adjusted such that the total number of detected manholes reaches a reasonable density (e.g. one every 500 meters) or matches the number expected by the network operators. In many cases, such information is available. If not, the threshold is set to the median prediction score.

Manhole qualification: since we use a sliding window strategy along the cable, a series of neighboring locations around any manhole will be classified as manholes and assigned label "1". We further set the rule that: segments of the cable are predicted as manhole locations only if they have over c consecutive predictions of "1" as manhole locations. In the experiments, c is set to 15 based on prior knowledge about the minimum length of slack fiber coils inside each manhole.

Experimental results show that our post-processing procedure can effectively combine information across multiple time periods and provide excellent localization performance.

Figure 19:
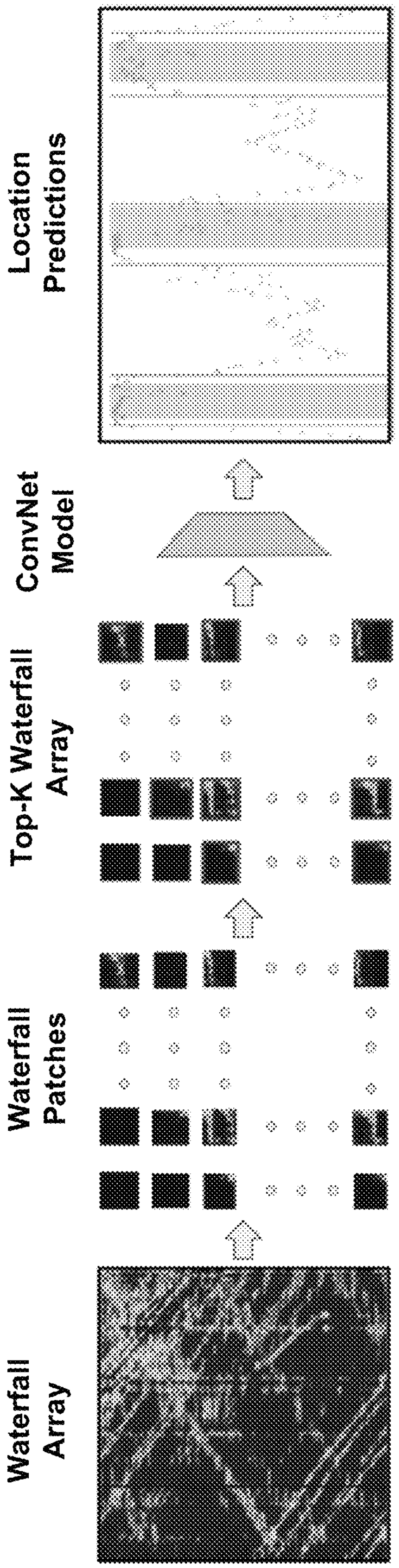
FIG. 19 is a schematic diagram showing illustrative top-K sampling-based approach according to aspects of the present disclosure.
Figure 20:
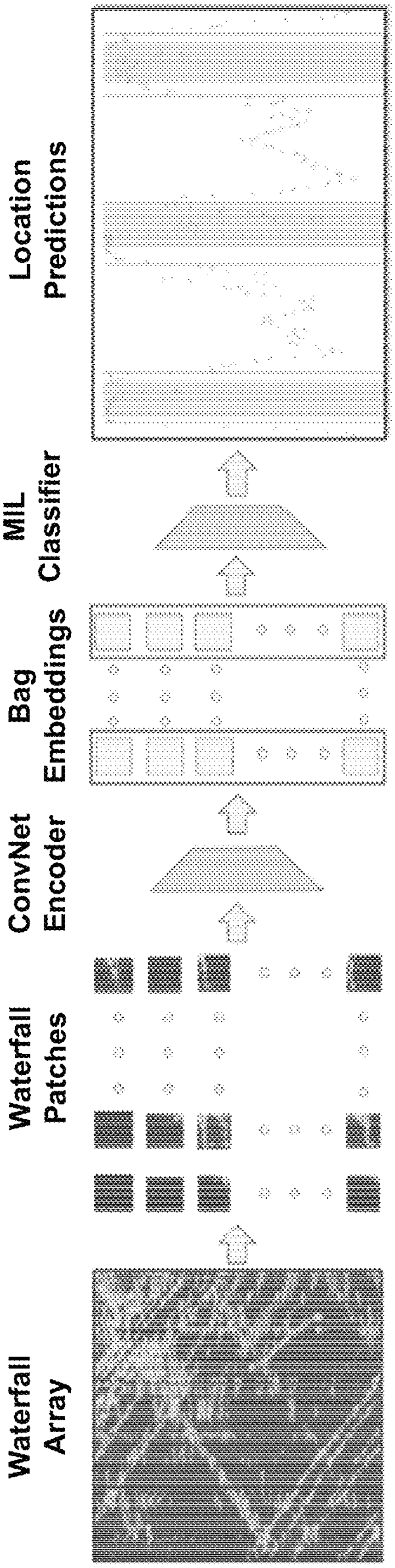
FIG. 20 is a schematic diagram showing illustrative multiple instance learning (MIL)-based approach according to aspects of the present disclosure.

In summary, the complete processing pipeline for the ConvNet model with top-K sampling can be seen in FIG. 19, which is a schematic diagram illustratively showing how informative images are selected with top-K sampling before being fed into the ConvNet model according to the present disclosure. The pipeline for the MIL-based model can be seen in FIG. 20, a schematic diagram showing illustrative multiple instance learning (MIL)-based approach according to aspects of the present disclosure. The pipeline of FIG. 20 shows in which bag embeddings are extracted by the ConvNet encoder model before being classified by the MIL model.

Real Data Performance Analysis

To demonstrate the effectiveness of our framework, we conducted extensive experiments on three existing deployed fiber optic networks. These experiments show that our model provides accurate predictions of manhole locations. In addition, we conducted several ablation studies that highlight the importance of each component of our model and analyze the performance of our approach in different settings.

Main Results

We evaluated the performance of our framework on three routes, with lengths ranging from 15 km to 25 km. A detailed description of the datasets size and other statistics can be found in Table 2.

TABLE 2

Dataset information about the 3 cable routes.

| Route | Length (km) | Duration (hrs) | Number of manholes | Number of patches |
|---|---|---|---|---|
| 1 | 20 | 120 | 76 | 30,000,000 |
| 2 | 17 | 20 | 46 | 5,000,000 |
| 3 | 16 | 75 | 40 | 14,000,000 |

Figure 21:
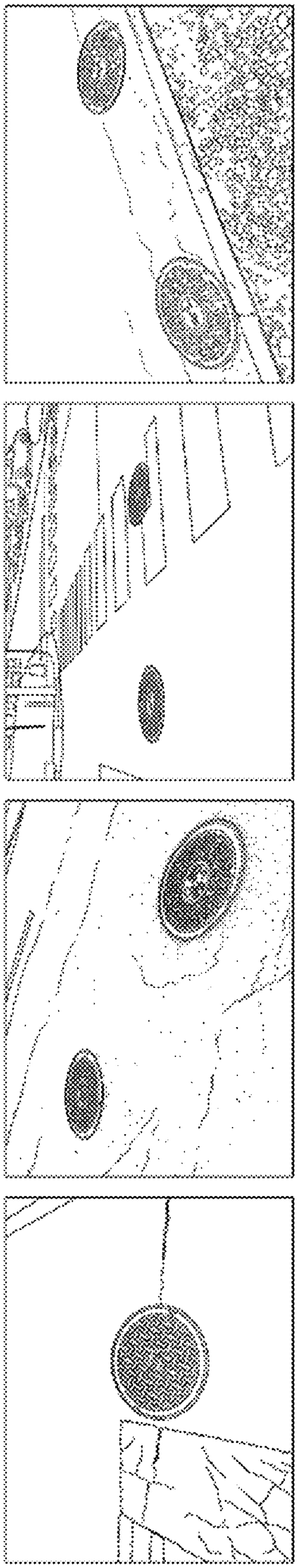
FIG. 21 is a photo-illustration showing example manholes in a roadway or close to a sidewalk according to aspects of the present disclosure.

FIG. 21 is a photo-illustration showing example manholes in a roadway or close to a sidewalk according to aspects of the present disclosure.

We evaluate the performance of our framework on two evaluation tasks: (i) the intermediate manhole classification task and (ii) the final manhole localization task. The key difference between these two tasks is that in manhole classification we predict whether an image contains a manhole pattern, while in manhole localization we specify the location of a manhole on the cable route. Although manhole localization is our final goal, evaluating classification performance allows us to verify that our model can distinguish between the manhole and non-manhole locations, and manhole localization is built upon manhole classification.

We use the following evaluation metric to quantify the model performance on manhole classification and localization:

ACC: accuracy, the ratio of samples get correctly classified (both manhole and non-manhole locations).

AUC: the area under the Receiver Operator Characteristic (ROC) curve.

Precision (P): the fraction of the predicted manhole samples/locations that are truly from manhole locations.

Recall (R): the fraction of the true manhole samples/locations that are successfully identified.

F1 score: the harmonic mean between precision and recall, $2_{PR/(P+R)}$.

Classification To evaluate the classification performance of our model, we create a dataset on each route with the top-K data selection strategy as described in Section 3. This dataset contains a balanced amount of data from the manhole and non-manhole locations. Note that this dataset is not created using a sliding window approach, which would result in an imbalanced dataset. Instead, manhole and non-manhole locations are picked with equal probability. This dataset is randomly split into three smaller datasets: a train dataset containing 60% of the data, a validation dataset containing 20% of the data, and a test dataset containing 20% of the data. These datasets contain no overlapping locations, so there is no information leakage. Several models with different hyper-parameters are trained and the one with the best performance on the validation dataset is picked. The hyperparameters tuned include the number of epochs the model is trained for, the batch size during training, the learning rate, and the weight decay parameter. The test performance of the ConvNet classifier on each road is evaluated under (i) instance-level labeling (Table 3), and (ii) group-level labeling assignment (Table 4). For these experiments we evaluate the performance of our framework over five different train/validation/test splits. The number in brackets refers to the standard deviation of the result across different splits, while the number not in brackets refers to the average result across different splits. Note that when group-level (location) label assignment is used, an additional MIL layer (with bag size equal to 10) is applied on top of the ConvNet.

TABLE 3

Classification results with instance-level assignment

| Route | ACC | F1 | AUC |
|---|---|---|---|
| 1 | 0.79 (0.04) | 0.84 (0.04) | 0.87 (0.04) |
| 2 | 0.79 (0.04) | 0.77 (0.04) | 0.80 (0.04) |
| 3 | 0.96 (0.06) | 0.95 (0.09) | 1.0 (0.0) |

TABLE 4

Classification results with group-level assignment

| Route | ACC | F1 | AUC |
|---|---|---|---|
| 1 | 0.77 (0.04) | 0.82 (0.04) | 0.86 (0.04) |
| 2 | 0.69 (0.03) | 0.79 (0.04) | 0.74 (0.04) |
| 3 | 0.96 (0.05) | 0.96 (0.05) | 0.99 (0.05) |

From Tables 3 and 4 we can see that both labeling strategies are able to achieve a high level of accuracy on all three roadways, indicating that the base convolutional architecture can successfully extract features relevant to manhole detection. In addition, while the group-level strategy can achieve a high F1 score on every roadway, its training accuracy and AUC score are slightly lower than that of instance-level assignments. This implies that although the group-level strategy can separate manhole and non-manhole locations with high probability, the classification probabilities provided by the model are not well calibrated. This is possibly due to the fact that the MIL layer can more easily overfit the data. For the localization results, we use a model trained and evaluated with the instance-level label assignment, which has more stable performance. We provide a more detailed analysis of the trade-off between the two strategies later in this disclosure.

To evaluate the generalization performance of our method on classification tasks, we evaluate the models performance on roadways it was not trained on. To expose the model with more data variability during training, we train and validate a model on two roadways, and test it on the third one. In particular, we train on a randomly selected 80% of the locations from the two training roadways and then validate on the remaining 20% of locations from the training roadways. The test result on the new unseen roadway can be seen in Table 5 for instance-level labeling and Table 6 for group-level labeling.

TABLE 5

Generalization results with instance-level label assignment

| Test Route | ACC | F1 | AUC |
|---|---|---|---|
| 1 | 0.72 (0.03) | 0.71 (0.02) | 0.74 (0.07) |
| 2 | 0.74 (0.16) | 0.86 (0.21) | 0.78 (0.09) |
| 3 | 0.90 (0.04) | 0.89 (0.04) | 0.98 (0.02) |

TABLE 6

Generalization results with group-level label assignment

| Test Route | ACC | F1 | AUC |
|---|---|---|---|
| 1 | 0.71 (0.09) | 0.77 (0.08) | 0.75 (0.12) |
| 2 | 0.64 (0.13) | 0.69 (0.17) | 0.66 (0.10) |
| 3 | 0.75 (0.10) | 0.74 (0.09) | 0.83 (0.11) |

As we can see from Tables 5 and 6, the generalization performance drops on the new, unseen test route. The performance drop indicates potential domain shifts between routes, which could be due to different pavement materials used on roads and cable-buried depths. Despite this, both instance-level and group-level classifiers can provide reasonably good accuracy as an intermediate step, which can be used for localization in the next.

Localization We consider two settings to evaluate our manhole localization framework: same roadway generalization and different roadway generalization. For the same roadway generalization, we train and validate on the first 80% of the data and test on another 20%. For different roadway generalizations, we train and validate on two roadways and do inference on the third one. Similar to the classification setting, we train on a randomly selected 80% of the locations from the two training roadways and then validate on the remaining 20% of locations from the training roadways. To generate manhole predictions, we follow the procedure previously described and use a ConvNet model with top-K sampling and instance-level label assignment. Across these experiments, the sliding window paradigm and the post-processing methods (including the adaptive score threshold and the minimum manhole length cutoff) are used. In practice, we find them very effective in alleviating domain shifts across different routes and further improving localization performance. In evaluation, we consider a manhole prediction to be correct if it overlaps with a real manhole and incorrect otherwise. We can then measure the precision, recall, and F1 scores of our model, which can be seen in Tables 7 and 8.

TABLE 7

| Same roadway generalization | | | |
|---|---|---|---|
| Route | Precision | Recall | F1 |
| 1 | 0.81 | 1.0 | 0.90 |
| 2 | 0.78 | 1.0 | 0.88 |
| 3 | 0.88 | 0.88 | 0.88 |

TABLE 7

| Different roadway generalization (localization) | | | | |
|---|---|---|---|---|
| Train Route | Test Route | Precision | Recall | F1 |
| 2, 3 | 1 | 0.73 | 0.70 | 0.71 |
| 1, 3 | 2 | 0.75 | 0.70 | 0.72 |
| 1, 2 | 3 | 0.79 | 0.89 | 0.84 |

From Table 7, we can see that our framework is able to achieve a high F1 score on all routes. Our framework is able to achieve an F1-score of over 0.88 on every route, indicating our framework can successfully localize manholes with only ambient data. On some roadways, we notice that the precision is slightly lower than recall. This indicates that while our framework can identify almost all manholes on the road, it may predict some non-manhole locations as manholes. We hypothesize that this happens because many locations on the road may emit manhole-like patterns, such as locations containing potholes or bridge junctions.

From Table 8 we can see that our framework is even able to generalize across roadways, despite an expected drop in performance due to a large covariate shift. This generalization ability is very useful because it means that when a cable is installed under a new road, the cable operator can simply apply our framework without any extra work. Despite the limitations of training data in terms of the number of routes and manholes, it can detect over 70% of the manholes on the new route. We note that there are a few manholes close to the sidewalk that are harder to detect. An interesting line of future work would be to utilize tools from the domain adaptation literature to improve generalization performance and close the gap between different roadway generalizations and the same roadway generalization.

Figure 22A:
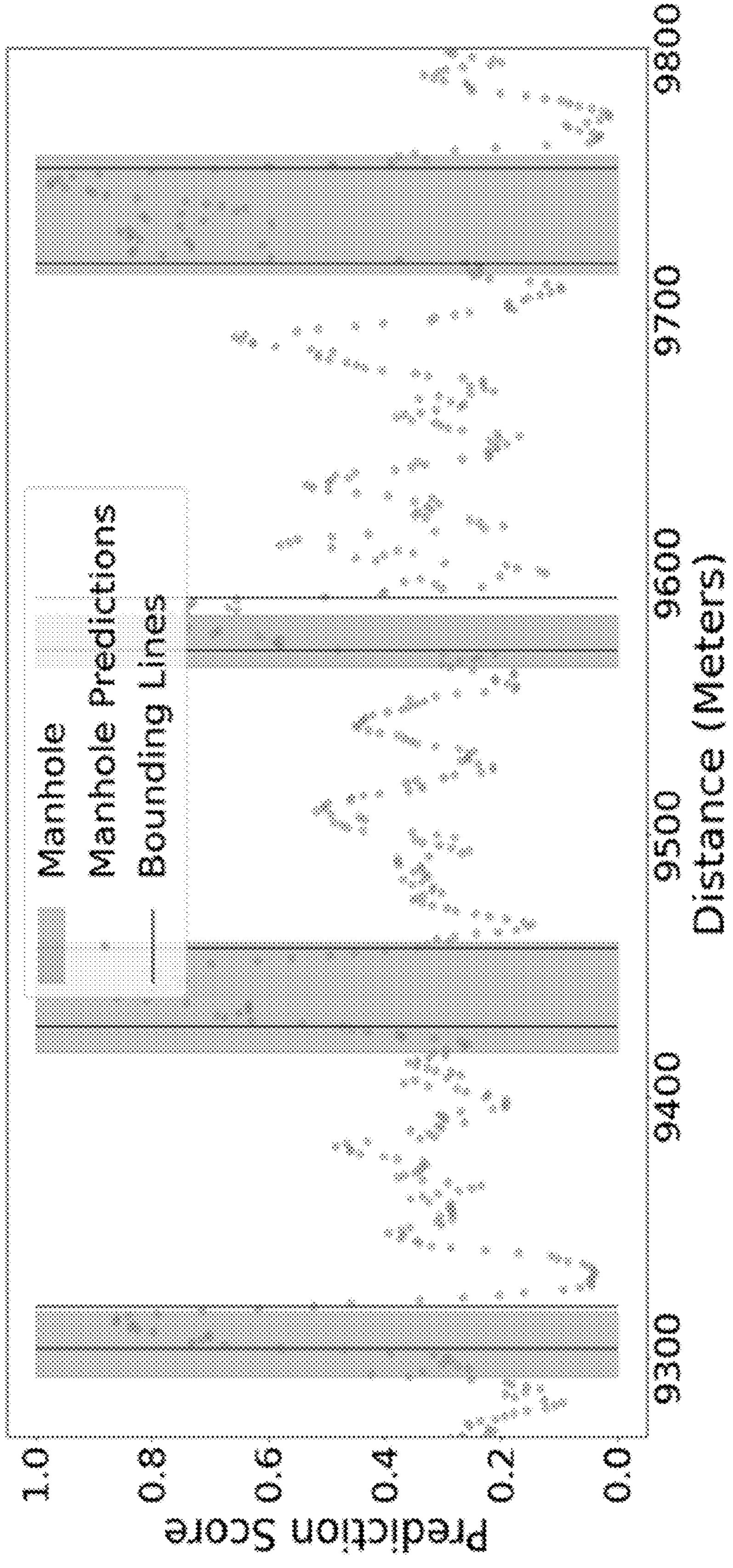
Figure 22B:
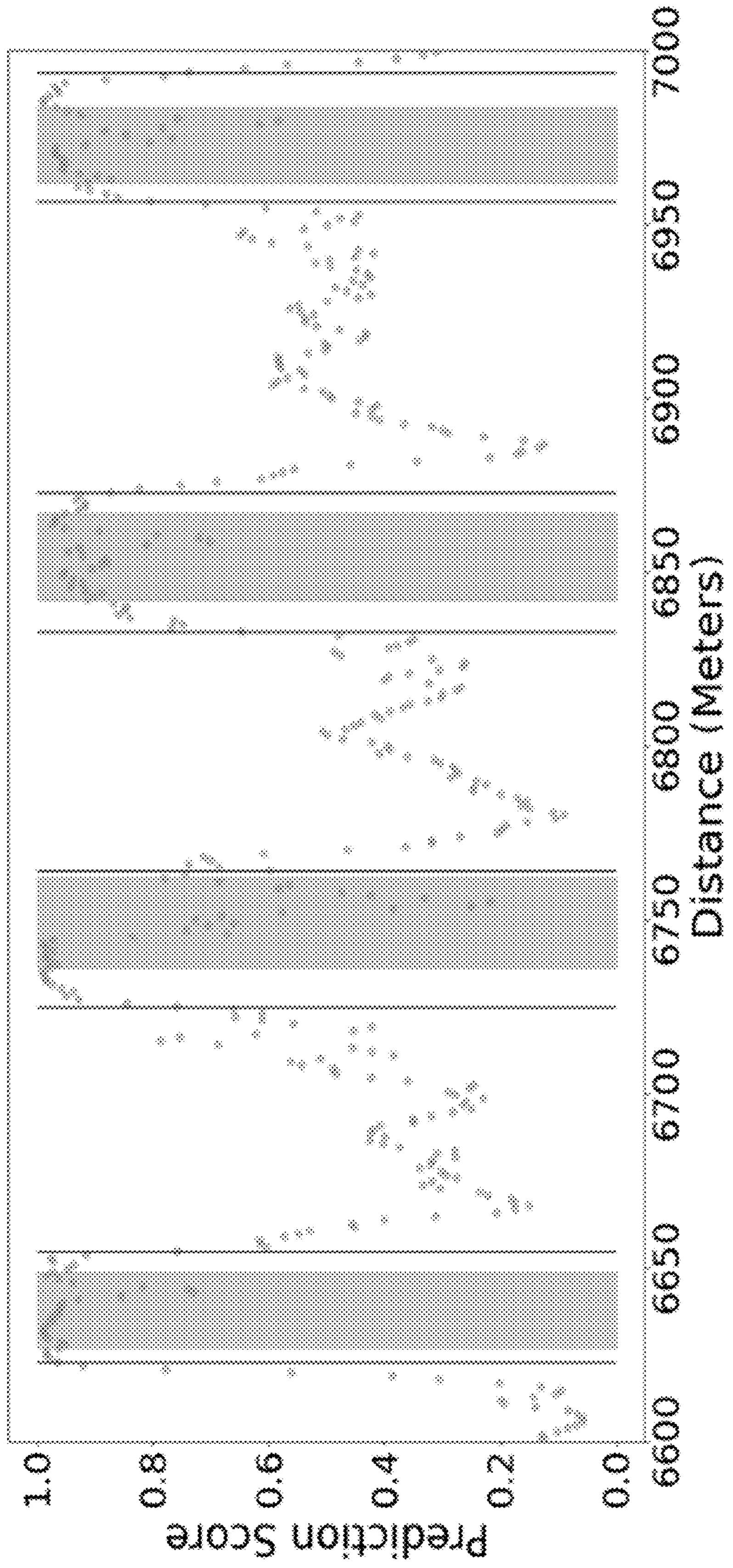

Beyond the F1 score, we can also visually inspect our framework's manhole predictions. In FIG. 22(A) and FIG. 22(B) we show a pair of plots of Prediction Score vs Distance for: FIG. 22(A) same road predictions on a roadway 1; and FIG. 22(B) different road predictions on a roadway 3, according to aspects of the present disclosure.

With reference to these figures, it may be observed that we plot the manhole predictions for both the same road predictions and different road predictions. These figures further confirm that our framework can generate accurate manhole predictions on both the same road it was trained on and new unseen roadways. Note that segments that only contain a partial manhole are not included in the training data set, it is interesting to see how the model handles it in the test time.

Ablation Experiments

We now describe additional factors of our framework and make several recommendations from a practitioner's perspective, including the influence of different dataset preparation strategies (sampling strategy and label assignment) and different amounts of data in both training and inference. The baseline method is ConvNet trained with instance-level label assignment, that may be used in many strongly supervised learning applications.

Data Preparation Strategy

First, we study the effect of data preparation strategies on performance. We consider two data selection heuristics: random data selection at each location and top-K data selection at each location. We also examine the two label assignment schemes: the basic instance-level scheme and the group-level scheme. Recall that when the group-level scheme is used, a MIL layer is appended onto the ConvNet model to select the most important images. We use location-level classification as our task in order to make the difference between methods clear. We present results from these models averaged across all three roadways in Table 9.

TABLE 9

| Ablation experiments averaged across all 3 roadways | | | | |
|---|---|---|---|---|
| Method | Label Assignment | Sampling | Test ACC | Test F1 |
| Baseline | Instance Level | random | 0.78 (0.07) | 0.77 (0.07) |
| With data selection | Instance Level | top-K | 0.85 (0.07) | 0.86 (0.06) |
| With MIL | Group Level | random | 0.81 (0.05) | 0.81 (0.05) |
| With both data selection and MIL | Group Level | top-K | 0.84 (0.08) | 0.85 (0.07) |

Note that for each roadway we run each experiment over 5 random seeds, and then present the averaged result (number not in brackets) over all 15 experiments for each method. The number in brackets refers to the standard deviation of the result across different runs.

From Table 9 we can see that with top-K sampling, both the instance-level and group-level strategies can accurately separate the manhole and non-manhole locations. This indicates that top-K sampling is an effective way to select useful images. With random sampling, performance drastically drops for the instance-level strategy and only mildly for the group-level labeling strategy. These results indicate that a group-level labeling strategy with a MIL layer can effectively select useful images and significantly outperform the instance-level strategy on randomly selected data. The gains in the F1 score from data selection, and both data selection and MIL are shown to be statistically significant based on a two-sample t-test.

Amounts of Training and Validation Data

Secondly, we evaluate the performance of our framework with varying amounts of training and validation data. To vary the amount of training data, we randomly select images from each location and select the top half of the images by intensity.

Figure 23A:
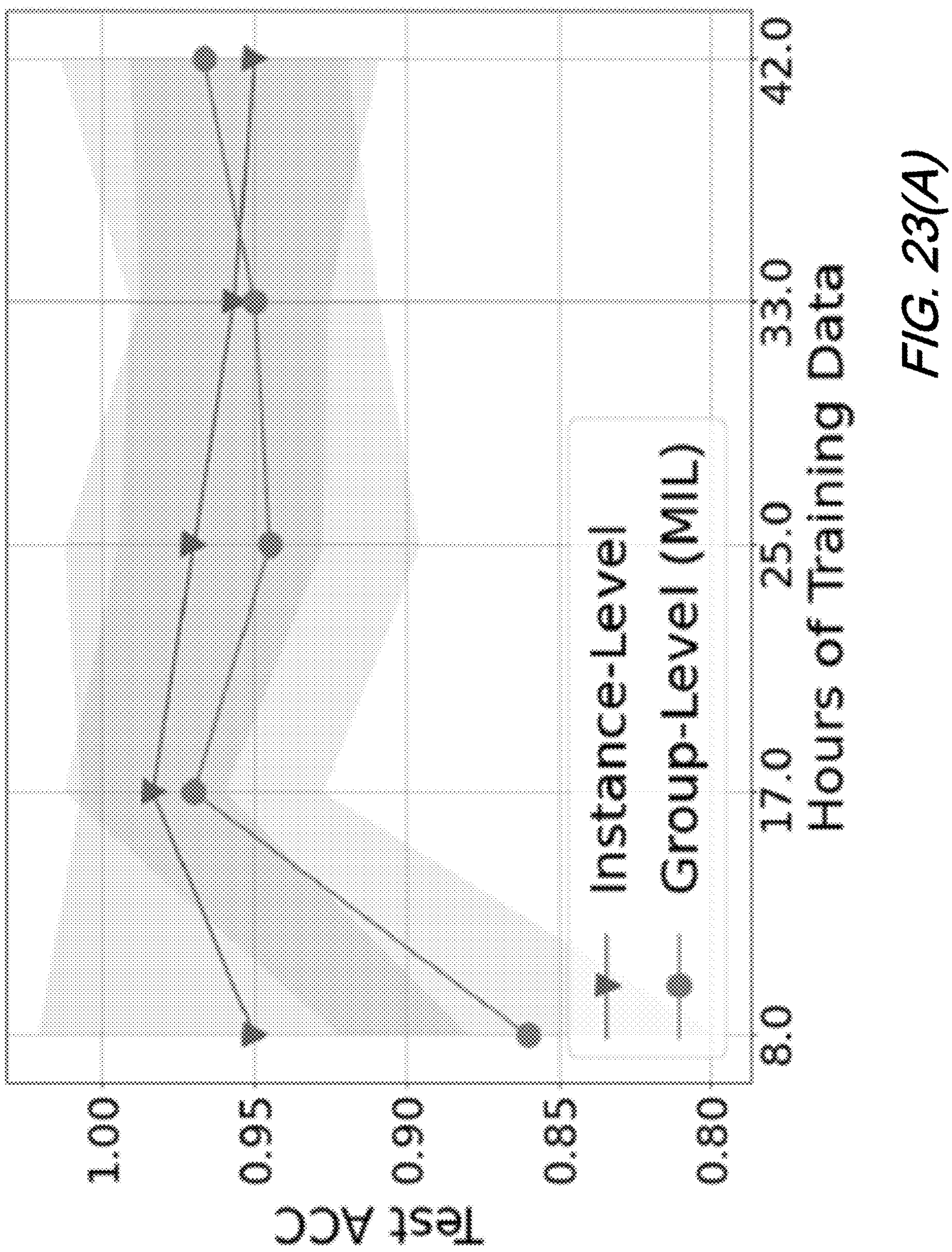
FIG. 23(A) and FIG. 23(B) are a pair of plots for: (A) Training data, and (B) Inference data according to aspects of the present disclosure.
Figure 23B:
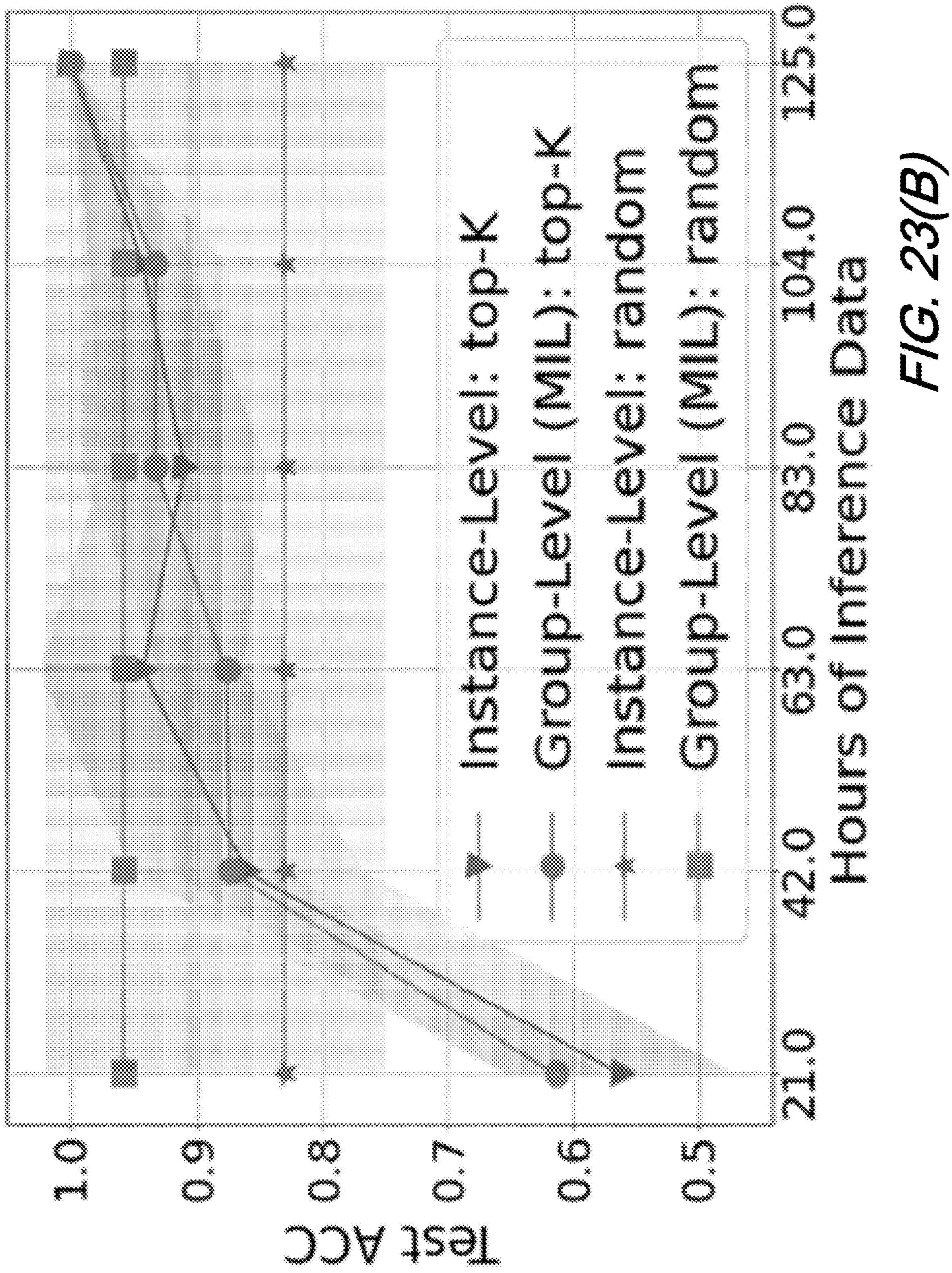

FIG. 23(A) and FIG. 23(B) are a pair of plots of Test vs. Hours of Training Data for: FIG. 23(A) Training data; and FIG. 23(B) inference, according to aspects of the present disclosure.

From FIG. 23(A), we can see that the instance-level labeling strategy achieves steady performance across all amounts of training data, while the performance of the group-level labeling strategy model drops ~9% with the lowest amounts of training data (8 hours). This performance drop implies that the MIL mechanism is more difficult to learn than the instance-level model and may require more training data.

Amounts of inference data We also investigate how each variant performs with varying amounts of inference data. For each amount of data, we select 500 points either using the top-K strategy or randomly. The results from this experiment on roadway three can be seen in FIG. 23(A) and FIG.

23(B), which are a pair of plots for: (A) Training data, and (B) Inference data according to aspects of the present disclosure.

We may observe from these figures that as the number of inference points decreases, the performance of the models trained with top-K sampling decreases drastically. This is because the top-K strategy will become less effective when it has fewer points to select from. On the other hand, the models trained with random data selection have a steady level of performance across varying amounts of data. In fact, the model trained with randomly selected data and group-level label assignment can achieve superior performance than models trained with top-K data selection with 5 times fewer inference images. Therefore, the group-level labeling strategy with random data selection would be more useful to a cable operator who needs predictions quickly (within one day), while the instance-level labeling strategy with top-K data selection will be more useful to a cable operator who can wait for inference results (at least 5 days). Altogether, FIG. 23(A) and FIG. 23(B) show how our framework takes advantage of abundant ambient data for both training and inference.

Visual Explanation of Model Performance

Figure 24A:
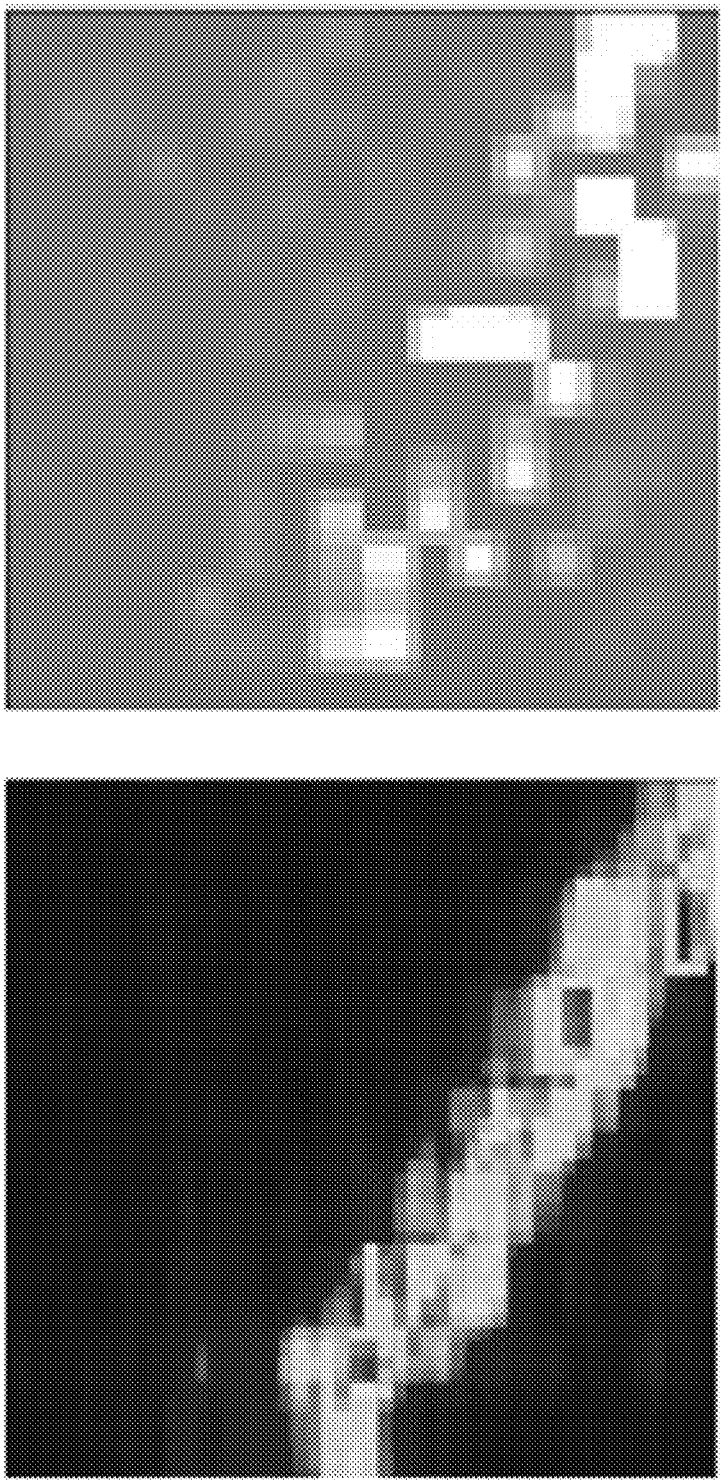
Figure 24B:
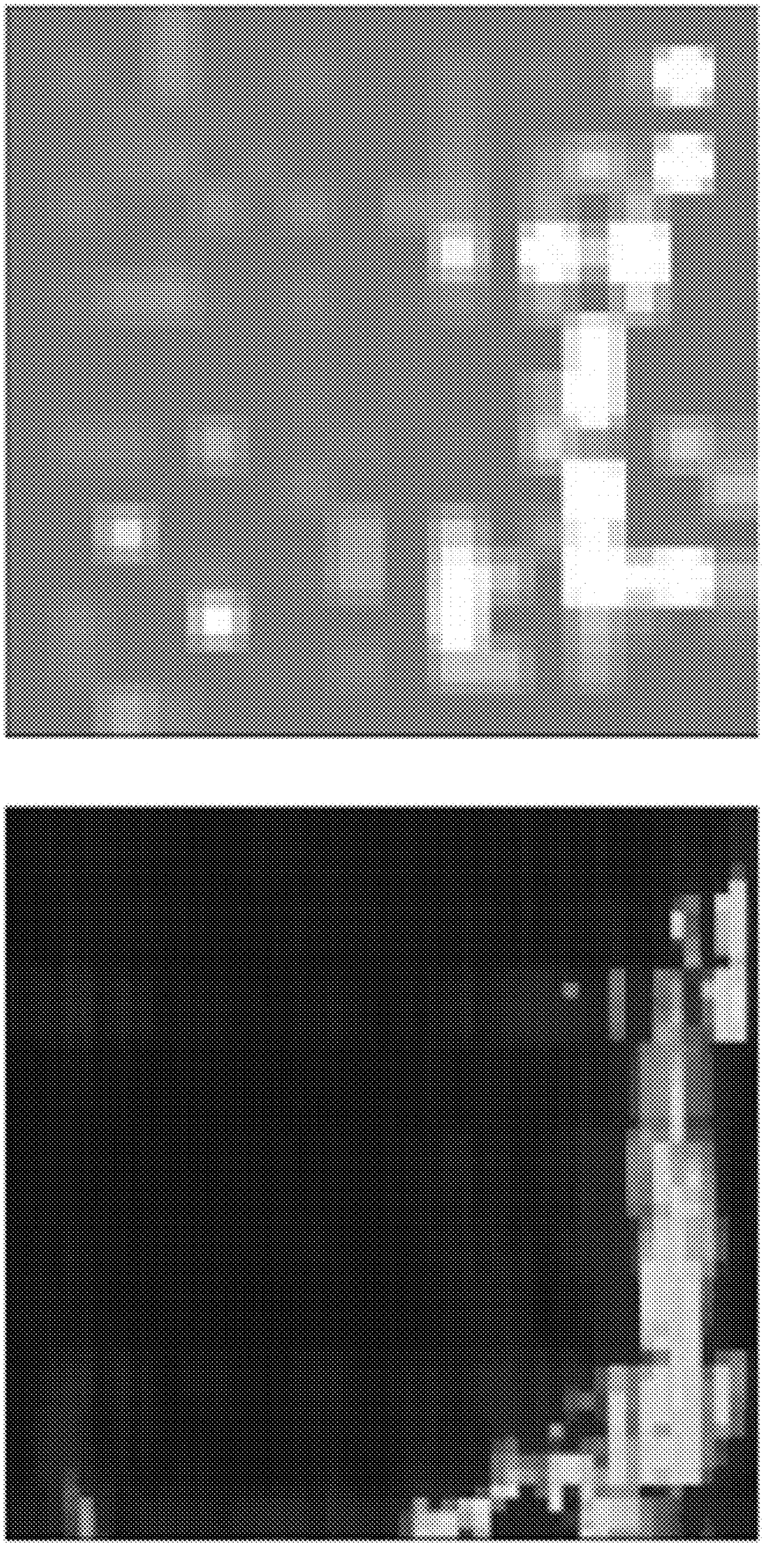

To verify that our machine learning model can recognize important waterfall patterns at an image level, we visualize which regions of the waterfall images are important for prediction with Grad-CAM, which uses the gradient of a target class prediction (i.e. manhole or non-manhole) with respect to the final layer convolutional layer to produce a heat map. In this heat map, regions with a higher gradient can be interpreted as having higher importance for the model's prediction. These heat maps are displayed next to the original image in as illustratively shown in FIG. 24(A) and FIG. 24(B) are a pair of waterfall plots and corresponding gradient plots at: FIG. 24(A) non-manhole location, and FIG. 24(B) manhole location in which lighter regions in the gradient plots represent higher gradient scores according to aspects of the present disclosure.

In these figures, we can see that the model assigns the greatest importance to vehicle traces and other vibration sources. This indicates that the model is learning physically coherent ways to distinguish between the manhole and non-manhole locations.

CONCLUSION

We have disclosed a DFOS system and machine learning method to automatically localize manholes, which forms a key step in a fiber optic cable mapping process. Our method utilizes weakly supervised learning methods to predict manhole locations based on ambient data captured from the route. To improve any non-informative ambient data, we disclose data selection and label assignment strategies and verify their effectiveness extensively in a variety of settings, including data efficiency and generalizability to different routes. We disclose that the post-processing step is very helpful in bridging the gap between classification and localization and combining results from multiple predictions.

Besides the weak informativeness of ambient data, the other two practical challenges are (i) the label noise from human annotation and (ii) covariate shift of DFOS data between routes. These challenges remain to be addressed in future work. The proposed framework can be used to predict potholes and road surface defects as well, which can be investigated as future DFOS applications with ambient data.

At this point, while we have presented this disclosure using some specific examples, those skilled in the art will recognize that our teachings are not so limited. Accordingly, this disclosure should only be limited by the scope of the claims attached hereto.

The invention claimed is:

1. A method employing weakly supervised learning for manhole localization based on ambient noise, the method comprising:

collecting, using a distributed fiber optic sensing (DFOS) system, sensing signals that include ambient noise over a period of time and generating, from the collected sensing signals, sensing test data;

identifying, in the sensing test data, DFOS locations indicative of manhole and non-manhole locations;

generating preprocessed sensing training data based on the identified DFOS locations in the sensing test data such that it contains strong vibrations at both manhole and non-manhole locations;

training, using the preprocessed sensing training data, a neural network;

applying the sensing test data to the trained neural network and obtaining, classification results on manhole and non-manhole locations; and outputting an indicia of the classification results including manhole and non-manhole locations.

2. The method of claim 1 further comprising:

applying the trained neural network to another DFOS route.

3. The method of claim 1 further comprising:

identifying, in the sensing test data, DFOS locations indicative of slack fiber locations.

4. The method of claim 3 further comprising:

estimating the length of the identified slack fiber locations.

5. The method of claim 4 further comprising:

identifying, in the sensing test data, DFOS locations indicative of road surface defects.

6. The method of claim 1 further comprising:

identifying, in the sensing test data by comparing the sensing test data to an existing map, or a partial site survey, or manual recognition, DFOS locations indicative of manhole and non-manhole locations.

7. The method of claim 1 further comprising:

training the neural network using the preprocessed sensing training data that is separated by different locations and different days.

* * * * *